(12) United States Patent
Obradovic et al.

(10) Patent No.: US 12,245,259 B2
(45) Date of Patent: Mar. 4, 2025

(54) INTERFERENCE REDUCTION IN TELECOMMUNICATION NETWORKS

(71) Applicant: Siemens Aktiengesellschaft, Munich (DE)

(72) Inventors: Dragan Obradovic, Ottobrunn (DE); Corinna Gottschalk, Munich (DE); Günter Steindl, Poppenricht (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 243 days.

(21) Appl. No.: 17/773,372

(22) PCT Filed: Oct. 30, 2019

(86) PCT No.: PCT/EP2019/079673
§ 371 (c)(1),
(2) Date: Apr. 29, 2022

(87) PCT Pub. No.: WO2021/083509
PCT Pub. Date: May 6, 2021

(65) Prior Publication Data
US 2023/0029977 A1 Feb. 2, 2023

(51) Int. Cl.
*H04W 72/54* (2023.01)
*H04L 1/16* (2023.01)
(Continued)

(52) U.S. Cl.
CPC .............. *H04W 72/54* (2023.01); *H04L 1/16* (2013.01); *H04L 41/12* (2013.01); *H04L 47/28* (2013.01);
(Continued)

(58) Field of Classification Search
CPC ..... H04W 72/54; H04W 48/16; H04W 72/12; H04L 1/16; H04L 41/12; H04L 47/28; H04L 47/801; H04L 47/826
See application file for complete search history.

(56) References Cited

U.S. PATENT DOCUMENTS 6,009,077 A * 12/1999 Firoiu .................. H04L 47/826
370/252
2006/0067235 A1 3/2006 Acharya et al. .............. 370/238
(Continued)

FOREIGN PATENT DOCUMENTS

CN 101601203 A 12/2009 ............. H04B 7/216
CN 102714520 A 10/2012 ............... H04B 3/54
(Continued)

OTHER PUBLICATIONS

Nayak et al: Incremental Flow Scheduling and Routing in Time-Sensitive Software-Defined Networks (May 2018) (Year: 2018).*
(Continued)

*Primary Examiner* — Kwang B Yao
*Assistant Examiner* — Bradley D Lytle, Jr.
(74) *Attorney, Agent, or Firm* — Slayden Grubert Beard PLLC

(57) ABSTRACT

Various embodiments of the teachings herein include a computer-implemented method for scheduling transmissions of a plurality of data streams in a telecommunication network. The transmissions are partitioned into transmission cycles with a predetermined length in time. Repetitive transmissions of each of the data streams are transmitted based on the predetermined length multiplied by a respective repetition rate. The method includes: determining a path through the network for the transmissions of each stream; determining a shared transmission links based on a comparison of the paths, wherein each shared transmission link is part of at least two of the paths; based on a numerical (Continued)

optimization, determining a phase of the repetitive transmissions for each data stream, the optimization using an objective function with a value for interference between two repetitive transmissions; and scheduling the transmissions of each data stream, wherein the transmissions start at a transmission cycle associated with the respective phase.

22 Claims, 7 Drawing Sheets

(51) Int. Cl.
    *H04L 41/12*     (2022.01)
    *H04L 47/28*     (2022.01)
    *H04L 47/70*     (2022.01)
    *H04L 47/80*     (2022.01)
    *H04W 48/16*     (2009.01)

(52) U.S. Cl.
    CPC ......... *H04L 47/801* (2013.01); *H04L 47/826* (2013.01); *H04W 48/16* (2013.01)

(56) References Cited

U.S. PATENT DOCUMENTS

| | | | |
|---|---|---|---|
| 2007/0116027 A1 | 5/2007 | Ciavaglia et al. | |
| 2008/0181160 A1 | 7/2008 | Dillon | 370/312 |
| 2009/0252172 A1 | 10/2009 | Hare | |
| 2012/0314785 A1 | 12/2012 | Hua | 375/260 |
| 2016/0183113 A1 | 6/2016 | Dua et al. | 370/329 |
| 2018/0115380 A1* | 4/2018 | Li | H04W 72/51 |
| 2018/0152970 A1 | 5/2018 | Lee et al. | |
| 2018/0302908 A1 | 10/2018 | Aijaz | |
| 2019/0021082 A1* | 1/2019 | Sun | H04W 72/04 |
| 2020/0120536 A1 | 4/2020 | Prakash et al. | |
| 2020/0358717 A1* | 11/2020 | Shah | H04L 47/827 |
| 2020/0394249 A1 | 12/2020 | Meunier et al. | |

FOREIGN PATENT DOCUMENTS

| | | | | |
|---|---|---|---|---|
| CN | 103036792 A | 4/2013 | ........... | H04L 45/122 |
| CN | 107113770 A | 8/2017 | ............... | G01S 5/14 |
| CN | 107683627 A | 2/2018 | ............. | H04W 72/04 |
| CN | 108 923 885 | 11/2018 | ............... | H04L 1/00 |
| CN | 108923885 A * | 11/2018 | ........... | H04L 1/0006 |
| CN | 110199278 A | 9/2019 | ............. | G06F 17/10 |
| EP | 0178548 A1 | 4/1986 | ................ | H04J 3/16 |
| EP | 1343099 A2 | 9/2003 | ............. | H04L 29/06 |
| EP | 3 417 576 | 11/2018 | ........... | H04L 12/721 |
| JP | 2007259226 A | 10/2007 | ............. | H04B 7/155 |
| WO | 2017/142994 | 8/2017 | ........... | H04L 12/701 |
| WO | 2020/030164 A1 | 2/2020 | ............. | H04W 72/04 |

OTHER PUBLICATIONS

Search Report for International Application No. PCT/EP2019/079676, 3 pages, Jun. 24, 2020.
https://en.wikipedia.org/wiki/Ethernet, 14 pages, Aug. 4, 2019.
https://en.wikipedia.org/w/index.php?title=IEEE_802.3&oldid=1081488864, IEEE 802.3, 6 pages, Apr. 7, 2022.
https://en.wikipedia.org/w/index.php?title=Ethernet&oldid=909327347, 16 pages, Mar. 25, 2022.
Graham, R. L.et al. (1979). "Optimization and Approximation in Deterministic Sequencing and Scheduling: a Survey" (PDF). Proceedings of the Advanced Research Institute on Discrete Optimization and Systems Applications of the Systems Science Panel of NATO and of the Discrete Optimization Symposium. Elsevier. pp. (5) 287-326]; 40 pages, 1979.
Abstract zu Lawler (1973): Optimal Sequencing of a single machine sub-ject to precedence constraints. Management Science 19, 544-546; (SdT ist kostenpflichtig, daher nur Abstract); 1 pages, Nov. 28, 2019.
Nayak Naresh Ganesh et al: "Incremental Flow Scheduling and Routing in Time-Sensitive Software-Defined Networks",IEEE Transactions on Industrial Informatics, IEEE Service Center, New York, NY, US, vol. 14, No. 5, May 1, 2018 (May 1, 2018), pp. 2066- 2075, XP011683100; 10 pages.
https://en.wikipedia.org/w/index.php?title=Time-Sensitive_Networking&oldid=906080116; 6 pages, Jul. 13, 2019.
https://en.wikipedia.org/w/index.php?title=Time-Sensitive_Networking&oldid=1079006803; 13 pages, Mar. 24, 2022.
https://en.wikipedia.org/wiki/AMPL; 6 pages, Nov. 1, 2019.
Chinese Office Action, Application No. 201980103119.2, 20 pages, May 30, 2023.
Cheng-Yi, Huo et al., "Study of Predecessor Attack in Rerouting Anonymous Communication System," Computer Engineering and Design, vol. 29, No. 5, 3 pages (Chinese w/ English abstract), Mar. 16, 2018.
Liang, Jia-wen et al., "Research on Priority Scheduling Problem Based on the Static Section of FlexRay," Science and Technology Bulletin, 05, DOI: 10.3969/j.issn.100y-1423.2016.06.002, 5 pages (Chinese w/ English abstract), May 31, 2019.
Yang, Yu et al., "Intensive Multi-Channel Network Flow Balancing Scheduling Method Based on Distributed Computing," Science and Technology Bulletin, vol. 35, No. 5, 4 pages (Chinese w/ English abstract), May 31, 2019.
Chinese Office Action, Application No. 201980103119.2, 8 pages, Dec. 22, 2023.
Chinese Office Action, Application No. 201980103120.5, 13 pages, May 9, 2024.
U.S. Non-Final Office Action, U.S. Appl. No. 17/773,269, 39 pages.

* cited by examiner

INTERFERENCE REDUCTION IN TELECOMMUNICATION NETWORKS

CROSS-REFERENCE TO RELATED APPLICATIONS

This application is a U.S. National Stage Application of International Application No. PCT/EP2019/079673 filed Oct. 30, 2019, which designates the United States of America, the contents of which are hereby incorporated by reference in their entirety.

TECHNICAL FIELD

The present disclosure relates to the field of telecommunication networks. Various embodiments of the teachings herein include computer-implemented methods for scheduling transmissions of a plurality of data streams and/or gateway nodes.

BACKGROUND

Currently there is a trend of using telecommunication networks also for transmission of time critical data. While telecommunication networks are used for a multitude of different applications, some applications such as applications in the industrial domain or in the domain of vehicle control require transmission of data within certain time constraints. Typically, in an industrial manufacturing environment, a separate telecommunication network is provided for controlling a manufacturing process, which is separate from another telecommunication network used for other data transmissions that are not time critical or not critical for the manufacturing process such as data communication for office communication or process planning, which typically requires a higher bandwidth, but no or at least less strict time constraints.

For telecommunication networks that allow data transmission within certain time constraints, several hard real-time or soft real-time technologies have been developed such as EtherCat or ProfinetIRT. However, using multiple telecommunication networks that are based on different standards may lead to a fragmentation of networks. On the other hand, using one telecommunication network, which allows hard real-time or soft real-time data communication, for different applications may increase the overall costs and/or requirements for (all) nodes of the network.

SUMMARY

The teachings of the present disclosure may be used to improve the reliability of transmitting data through a telecommunication network within certain time constraints and/or to reduce requirements for nodes of such a telecommunication network allowing data transfer—e.g. transmitting of data through the telecommunication network—within certain time constraints, wherein e.g. such nodes of the telecommunication network that have lower or no requirements for data transfer within certain time limits have to fulfil less or even no (special) requirements, e.g. besides according to a communication standard of the telecommunication network such as some of the Ethernet standards.

For example, some embodiments of the teachings herein include a computer-implemented method (700) for scheduling transmissions of a plurality of data streams (210) in a telecommunication network (100, 102), wherein the transmissions are partitioned into transmission cycles (531, 532, 533, 534), the transmission cycles having a predetermined length in time, and wherein respective repetitive transmissions of each of the plurality of data streams (210) are transmitted with a time interval determined by the predetermined length in time of the transmission cycles multiplied by a respective repetition rate of the respective repetitive transmissions, the method comprising (700): (724) determining, for each (212, 214, 216, 217, 218) of the plurality of data streams (210), a respective path (222, 224, 226, 227, 228; 230, 232) through the telecommunication network (100, 102) used for the respective repetitive transmissions of the respective data stream; (726) determining a plurality of shared transmission links (120) based on a comparison of the paths (222, 224, 226, 227, 228) through the network, wherein each of the shared transmission links (126, 130, 136, 144, 146) is part of at least two of the paths; based on a numerical optimization, determining (740) a respective phase of the respective repetitive transmissions for each of the plurality of data streams (210), the numerical optimization having an objective function comprising at least one value indicative of interference between two or more repetitive transmissions of the plurality of data streams (210); and (750) scheduling the respective repetitive transmissions of each of the plurality of data streams (210), wherein the respective repetitive transmissions start at a transmission cycle associated with the respective phase.

In some embodiments, the numerical optimization is implemented using a mixed integer linear program and is performed by a gateway node (116, 184, 800) of the telecommunication network (100, 102).

In some embodiments, for at least one phase, at least one group of respective repetitive transmissions of respective data streams of the plurality of data streams (210) is from at least one originator node, wherein the at least one originator node is adapted to transmit the repetitive transmissions of the at least one group within transmission cycles associated with the at least one phase according to their respective phases and respective repetition rates, wherein an order of transmission within each of these transmission cycles is determined by a transmission order of the at least one group; wherein the method further comprises determining, after determining (740) respective phases for each of the plurality of data streams, the transmission order of the at least one group by sorting each repetitive transmissions of the at least one group based on a comparison function taking into account a respective worst-case arrival time of the respective repetitive transmissions.

In some embodiments, the method further comprises (730) receiving at least one configuration signal, the at least one configuration signal being indicative of the repetition rates of the repetitive transmissions of the plurality of data streams (210).

In some embodiments, the at least one value is based on a respective total traveling time of the respective repetitive transmissions of each of the plurality of data streams (210).

In some embodiments, the objective function of the numerical optimization further comprises an aggregate total travelling time, the aggregate total travelling time being an aggregation (748) of each of the values of the total traveling times.

In some embodiments, the numerical optimization takes into account one or more upper limits selected from a group comprising: a worst-case traveling time, a worst-case arrival time, a worst-case delay and a worst-case aggregate total travelling time.

In some embodiments, the respective total travelling time depends on one or more transmission delays encountered along the respective path (222, 224, 226, 227, 228; 230, 232) and depends on the interference between the respective repetitive transmissions and other repetitive transmissions of the plurality of data streams (210); the worst-case arrival time is determined (744) by the maximum of each of the respective total travelling times including an interference at a respective originator node (112, 114, 116, 118); and the worst-case delay is determined (746) by the maximum of each of the respective total travelling times excluding an interference at a respective transmission node (116).

In some embodiments, the method (700) further comprises selectively (714) providing (758) a warning signal if the numerical optimization fails to meet at least one of the one or more upper limits.

In some embodiments, the numerical optimization comprises determining the at least one value indicative of the interference for a predetermined number of transmission cycles (531, 532, 533, 534) and minimizing an aggregation of the values indicative of the interference across the predetermined number of transmission cycles.

In some embodiments, the respective repetition rate of the respective repetitive transmissions of each of the plurality of data streams (210) is an integer power of two and wherein the predetermined number of transmission cycles is a maximum of the repetition rates.

In some embodiments, the telecommunication network (100) has a tree-type topology, and wherein the respective path (222; 224; 226, 227; 228) is uniquely determined based on a respective originator node (112; 114; 116; 118) and a respective destination node (162; 164; 166) for each of the plurality of data streams (210).

In some embodiments, the computer-implemented method (700) further comprises (720) receiving at least one configuration signal from at least one originator node, the at least one originator node being adapted to transmit respective repetitive transmissions of at least one of the plurality of data streams, wherein the at least one configuration signal is indicative of at least one of the plurality of data streams (210), the at least one originator node and at least one destination node, the at least one destination node being adapted to receive respective repetitive transmissions of the at least one of the plurality of data streams; (722) establishing topology data being indicative of a topology of the telecommunication network (100, 102); and (724) determining the respective path or a further respective path, from the at least one originator node to the at least one destination node, for the at least one of the plurality of data streams (210).

In some embodiments, the telecommunication network (100, 102) is a time sensitive network.

As another example, some embodiments include a gateway node (800) for a telecommunication network (100, 102), comprising a data processing apparatus (840) adapted to: (724) determine, for each of a plurality of data streams, a respective path through the telecommunication network used for respective repetitive transmissions of the respective data stream; (726) determine a plurality of shared transmission links based on a comparison of the paths through the network (100, 102), wherein each respective shared transmission link (126, 130, 136, 144, 146) is part of at least two of the paths; based on a numerical optimization, determine (740) a respective phase of the respective repetitive transmissions for each of the plurality of data streams (210), the numerical optimization having an objective function comprising at least one value indicative of interference between two or more repetitive transmissions of the plurality of data streams; and (750) schedule the respective repetitive transmissions of each of the plurality of data streams (210), wherein the respective repetitive transmissions start at a transmission cycle (531, 532, 533, 534) associated with the respective phase.

BRIEF DESCRIPTION OF THE DRAWINGS

The above and other embodiments, modifications, improvements, elements, features, steps, and characteristics of the present disclosure will be more apparent from the following detailed description of exemplary embodiments and the appended figures. When not stated otherwise or following otherwise from the context, like reference signs referred to corresponding apparatuses, elements or features of the exemplary embodiments and throughout the figures.

DETAILED DESCRIPTION

Figure 1:
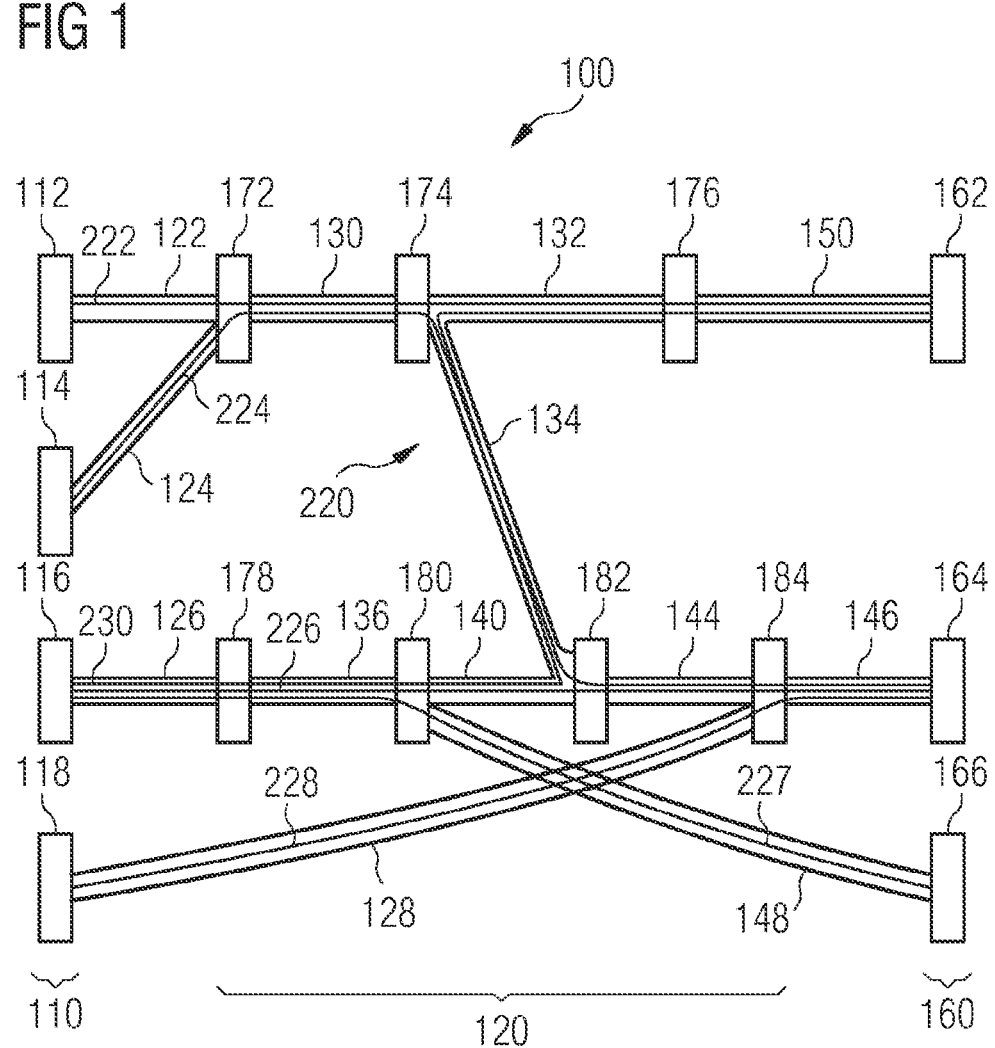
FIG. 1 schematically illustrates a network scheduling apparatus with a telecommunication network incorporating teachings of the present disclosure.

Some embodiments of the teachings herein include a computer-implemented method for scheduling transmissions of a plurality of data streams in a telecommunication network. The transmissions are partitioned into transmission cycles, wherein the transmission cycles have a predetermined length in time, and wherein respective repetitive transmissions of each of the plurality of data streams are transmitted with a time interval determined by the predetermined length in time of the transmission cycles multiplied by a respective repetition rate of the respective repetitive transmissions. The method comprises determining, for each of the plurality of data streams, a respective path through the telecommunication network used for the respective repetitive transmissions of the respective data stream. Furthermore, the method comprises determining a plurality of shared transmission links based on a comparison of the paths through the network, wherein each of the shared transmission links is part of at least two of the paths. Moreover, the method further comprises determining, based on a numerical optimization, a respective phase of the respective repetitive transmissions for each of the plurality of data streams. The numerical optimization has an objective function comprising at least one value indicative of interference between two or more repetitive transmissions of the plurality of data streams. Moreover, the method further comprises scheduling the respective repetitive transmissions of each of the plurality of data streams, wherein the respective repetitive transmissions start at a transmission cycle associated with the respective phase.

Scheduling the respective repetitive transmissions in accordance with the respective phase of each respective repetitive transmissions for each of the plurality of data streams may provide this scheduling is a deterministic scheduling, whereby reliability of data transfer and/or of transmitting the repetitive transmissions through the telecommunication network—e.g. from an originator node to e.g. a destination node—may be improved. Moreover, the, e.g., deterministic scheduling may facilitate guaranteeing data transfer—e.g. transmitting the data at the originator node and arrival of the data at the destination node—within a certain time constraints such as a predetermined time span or a predetermined number of transmission cycles.

Determining the phases of the repetitive transmissions of the data streams based on the numerical optimization may provide that optimal values for the respective phases may be determined in an efficient and/or reliable manner, whereby e.g. it may be guaranteed that the respective repetitive transmissions of each of the data streams arrives at a respective destination node within a certain time constraints—i.e. in particular within a predetermined number of transmission cycles, e.g. within one transmission cycle—and/or more bandwidth and/or processing time remains for other data transfer such as the data transmissions with a lower priority than the repetitive transmissions of the data streams.

By determining the phases of the repetitive transmissions for the data streams and by scheduling the repetitive transmissions with respect to the transmission cycles, the determining based on the numerical optimization and/or the scheduling and transmitting of data—e.g. the transmission of the repetitive transmissions through the telecommunication network—may be simplified, wherein e.g. timing with a high precision—i.e. a precision enabling to distribute transmissions within one transmission cycle, typically being in the range of 200 ns to 100 µs—is not required, but it is, e.g., sufficient to synchronize the timing of data transmission in accordance with the transmission cycles, which may, e.g., have a typical time interval in the order of 500 µs to 50 ms, typically about 1 ms.

Moreover, while e.g., originator nodes—e.g. nodes of the telecommunication network transmitting at least one of the repetitive transmissions—may be required to synchronize their transmissions according to the transmission cycles, and thus to use a synchronized timebase, other nodes of the telecommunication network do not necessarily require the use of a synchronized timebase—e.g. at least as long as these nodes do not transmit data transmissions interfering with the repetitive transmissions, i.e. in particular transmit these data transmissions during transmission cycles for the repetitive transmissions or a part of the transmission cycles reserved for the repetitive transmissions, and/or at least as long as data transmissions these nodes have a lower priority than the repetitive data transmissions of the data streams, and thus are rejected or buffered for a later transmission. Yet, e.g., some or all of the other nodes may be required to at least forward a time synchronization signal, in order to provide the time synchronization signal to the originator nodes, wherein each node of the originator nodes is adapted to establish the synchronized timebase based on the time synchronization signal.

In some embodiments, the telecommunication network is a time sensitive network. This may beneficially facilitate partitioning data transmissions into the transmission cycles, which may also be called network cycles. Furthermore, this may beneficially facilitate providing a time synchronization signal and/or establishing a synchronized timebase for partitioning the data transmissions into the network cycles. Moreover, this may beneficially facilitate assigning a higher priority to the respective repetitive transmissions of each of the data streams and assigning a lower priority to other data transmissions, e.g. other data transmissions such as office communication or process planning. Moreover, in some implementations, data transmission of the data transmissions having a lower priority is limited by means of a preemption mechanism, wherein the preemption mechanism is adapted to guarantee data transmission of the high-priority transmissions such as the repetitive transmissions.

Within the meaning of the present disclosure a "time sensitive network" may at least refer to a telecommunication network, wherein the telecommunication network is adapted to transfer time-sensitive data based on network cycles, wherein all nodes of the telecommunication network have a common timebase. Moreover, such a time sensitive network may be adapted for a time-sensitive transmission of data over Ethernet networks. For this purpose, the time sensitive network may have a central instance that is adapted to provide a time synchronization signal.

Furthermore, all nodes may be adapted to—at least— forward the time synchronization signal. Furthermore, some of the nodes—e.g. nodes transmitting data—may be adapted to establish a synchronized timebase based on the time synchronization signal. Moreover, such a time sensitive network may be according to the Ethernet standards under IEEE 802.1Q. Hence, data transfer may be partitioned into time-sensitive data transfer and other data transfer, wherein the time-sensitive data transfer may be transmitted via a Virtual LAN defined on top an underlying telecommunication network—e.g. the time sensitive network as a whole —, the underlying telecommunication network according to Ethernet standards such as IEEE 802.3. Further details regarding a telecommunication network according to Ethernet standards are, e.g., be given by https://en.wikipedia.org/wiki/Ethernet e.g. in a version dated Aug. 4, 2019 https://en.wikipedia.org/w/index.php?title=Ethernet-&oldid=909327 347 and further details regarding a time sensitive network are, e.g., given by https://en.wikipedia.org/wiki/Time-Sensitive_Networking e.g. in a version dated Jul. 13, 2019 https://en.wikipedia/w/index.php?title=Time Sensitive_Networking&oldid=906080116.

In some embodiments, in which the telecommunication network is a time sensitive network, or for an embodiment used for controlling a time critical process such as a manufacturing process or a process for controlling an—e.g. autonomous—vehicle, a requirement may be that all high-priority data transmissions, e.g. the repetitive data transmissions—reach their respective destination node within one network cycle without loss of transmissions, e.g. without frame losses. Hence, the telecommunication network has to be planned and/or provided including the data transmission sending order—e.g. the order of the transmission of the repetitive transmissions —, paths through the telecommunication network for transmitting the repetitive transmissions, and a phase-allocation. These requirements may beneficially be fulfilled by combining a time sensitive network as the telecommunication network with the determining of the phases based on the numerical optimization and the scheduling of the repetitive transmissions according to the phases and with respect to the network cycles. Moreover, by means of a preemption mechanism interference of data transmissions having a lower priority may beneficially be avoided.

In some embodiments, the respective repetitive transmissions of each of the data streams have a high priority, whereas, other data transmissions have a low priority, wherein at least a certain amount of data transmissions having a high priority is transmitted before data transmissions having a low priority are transmitted, e.g. at/through a transmission link. In some implementations, also the data transmissions having a low priority are scheduled based on a phase allocation—e.g. based on respective phases —, which is/are determined based on an optimization similar or equal to the numerical optimization. This may beneficially improve the utilization of a bandwidth of the telecommunication network.

Within the meaning of the present disclosure a "high-priority" or, respectively, a "low priority" may at least refer to the terms used, e.g., with regard to Ethernet standards. Moreover, these terms may also refer to a relative priority, wherein data transmissions with a high priority have a higher priority than data transmissions with a low priority, or, respectively, data transmissions with a low priority have a lower priority than data transmissions with a high priority.

In some embodiments, there is a gateway node for a telecommunication network. The gateway node comprises a data processing apparatus. The data processing apparatus is—e.g. in conjunction with the gateway node—adapted to determine, for each of a plurality of data streams, a respective path through the telecommunication network used for respective repetitive transmissions of the respective data stream. Furthermore, the data processing apparatus is adapted to determine a plurality of shared transmission links based on a comparison of the paths through the network, wherein each respective shared transmission link is part of at least two of the paths. Moreover, the data processing apparatus is further adapted to determine, based on a numerical optimization, a respective phase of the respective repetitive transmissions for each of the plurality of data streams, wherein the numerical optimization has an objective function comprising at least one value indicative of interference between two or more repetitive transmissions of the plurality of data streams. Moreover, the data processing apparatus is further adapted to schedule the respective repetitive transmissions of each of the plurality of data streams, wherein the respective repetitive transmissions start at a transmission cycle associated with the respective phase.

The embodiments, implementations, modifications, further modifications and further improvements as described in detail in connection with the methods as well as potential benefits and advantages also apply correspondingly to the gateway nodes described herein. Hence, according to some embodiments, the gateway node is adapted to perform a method as described herein, or, respectively, some embodiments of the method are performed by a gateway node incorporating teachings of the present disclosure.

In some embodiments, there is a computer-implemented method for scheduling transmissions of a plurality of data streams through a telecommunication network, wherein the transmissions are partitioned into transmission cycles and the transmission cycles have a predetermined length in time. Furthermore, the telecommunication network comprises a plurality of shared transmission links, wherein each shared transmission link of the plurality of shared transmission links is shared by at least two of the plurality of data streams. The method comprises determining, based on at least one optimization and with respect to the transmission cycles, a respective phase of respective repetitive transmissions for each of the plurality of data streams, wherein the at least one optimization has at least one objective function comprising at least one value indicative of interference at the plurality of shared links between two or more repetitive transmissions of the plurality of data streams. Furthermore, the method comprises scheduling the respective repetitive transmissions of each of the plurality of data streams in accordance with the respective phase.

In some embodiments, there is a network scheduling apparatus for a telecommunication network, wherein transmissions through the telecommunication network are partitioned into transmission cycles. The network scheduling apparatus comprises a data processing apparatus. The data processing apparatus is—e.g. in conjunction with the network scheduling apparatus—adapted to determine, based on at least one optimization and with respect to the transmission cycles, a respective phase of respective repetitive transmissions for each of a plurality of data streams, the at least one optimization having at least one objective function comprising at least one value indicative of interference between two or more repetitive transmissions of the plurality of data streams. Furthermore, the data processing apparatus is—e.g. in conjunction with the network scheduling apparatus— adapted to schedule the respective repetitive transmissions of each of the plurality of data streams in accordance with the respective phase.

In some embodiments, there is a system comprising a network scheduling apparatus and one or more originator nodes for a telecommunication network or comprising a gateway node and one or more originator nodes for a telecommunication network. In some embodiments, the one or more originator nodes are a nodes of the telecommunication network.

The embodiments, implementations, modifications, further modifications, and further improvements as described in detail in connection with the preceding aspects as well as potential benefits and advantages also apply correspondingly to the methods described herein, the network scheduling apparatuses, and the systems incorporating teachings of the present disclosure.

In some embodiments, the transmission cycles are determined by a synchronized clock signal or a time synchronization signal. In some implementations, the time synchronization signal is a synchronized clock signal. In some of such implementations, the synchronized clock signal is provided by a clock device of the telecommunication network.

In some embodiments, the network scheduling apparatus or the gateway node comprises a clock device adapted to provide a time synchronization signal.

In some embodiments, the network scheduling apparatus or the gateway node is adapted to schedule the respective repetitive transmissions by providing a scheduling signal to the one or more originator nodes, the scheduling signal comprising the phases.

In some embodiments, the network scheduling apparatus or the gateway node is adapted for scheduling a respective repetitive transmissions by providing a respective scheduling signal to each one of the one or more originator nodes, each respective scheduling signal comprising the respective phase.

In some embodiments, at least one of the one or more originator nodes is adapted to receive the scheduling signal or, respectively, the respective scheduling signal. The at least one of the one or more originator nodes is further adapted to transmit the respective repetitive transmissions of at least one of the plurality of data streams in accordance with the respective phase. In some implementations, the at least one of the one or more originator nodes is further adapted to transmit the respective repetitive transmissions of the at least one of the plurality of data streams in accordance with the respective phase and in accordance with the respective repetition rate.

In some embodiments, each of the one or more originator nodes is adapted to receive the scheduling signal/respective scheduling signal and to transmit the respective repetitive transmissions of at least a respective one of the plurality of data streams in accordance with the respective phase. In some implementations, each of the one or more originator nodes is further adapted to transmit the respective repetitive transmissions of the at least one of the plurality of data streams in accordance with the respective phase and in accordance with the respective repetition rate.

The above summary is merely intended to give a short overview over some features of some embodiments and implementations and is not to be construed as limiting. Other embodiments may comprise other features than the ones explained above. In the following, various embodiments are be described in detail with reference to the appended figures. It is to be understood that the following description of embodiments is not to be taken in a limiting sense. The scope of the disclosure is not limited by the embodiments described hereinafter or by figures, which are taken to be illustrative only.

The figures are to be regarded as being schematic representations and elements illustrated in the figures, which are not necessarily shown to scale. Rather, the various elements are represented such that their function and their general purpose become apparent to a person skilled in the art. Any connection or coupling between functional blocks, devices, components or other physical or functional units shown in the figures or described herein may also be implemented as an indirect connection or coupling. A coupling between components may be established over a wireless connection. Functional blocks may be implemented in hardware, firmware, software, or a combination thereof.

FIG. 1 schematically illustrates a network scheduling apparatus 300 incorporating teachings of the present disclosure in conjunction with a telecommunication network 100. Moreover, telecommunication network 100 or parts thereof may comprise, e.g. a system comprising one or more originator nodes of the telecommunication network and a network scheduling apparatus, the network scheduling apparatus adapted for scheduling data transmissions originating from the originator nodes.

In some embodiments, the network scheduling apparatus 300 comprises at least one communication interface 320 for providing a scheduling of transmissions of a plurality of data streams in the telecommunication network 100. Furthermore, the network scheduling apparatus 300 comprises a data processing apparatus 340 adapted to determine the scheduling.

In some embodiments, the telecommunication network 100 comprises a plurality of originator nodes 110, a plurality of transmission links 120, and a plurality of destination nodes 160. In some implementations, one or more of the originator nodes 110 are industrial apparatuses, e.g. for a manufacturing process, such as CNC machines, robots, conveyors, lamps, or windmills. In some implementations, one or more of the destination nodes 160 are industrial apparatuses, e.g. for a manufacturing process, such as CNC machines, robots, conveyors, lamps, or windmills.

In some embodiments, one or more of the originator nodes 110 and one or more of the destination nodes 160 are industrial apparatuses, e.g. for a manufacturing process, such as CNC machines, robots, conveyors, lamps, or windmills. In some implementations, a first industrial apparatus of the originator nodes 110 is adapted to control, via the telecommunication network 100—e.g. via some of the plurality of transmission links 120 —, a second industrial apparatus of the destination nodes 160. Furthermore, the second industrial apparatus may be adapted to provide a sensor signal—e.g. for a feedback loop for controlling the second industrial apparatus —, via the telecommunication network 100, to the first industrial apparatus. Hence, e.g., with regard to the sensor signal the first and the second industrial apparatus change the roles in relation to the telecommunication network 100, wherein, when providing the sensor signal, the second industrial apparatus is an originator node and the first industrial apparatus is a destination node.

In some embodiments, the plurality of originator nodes 110 is data connected to the plurality of destination nodes 160 via the plurality of transmission links 120, wherein the telecommunication network 100 further comprises a plurality of link nodes, the link nodes respectively being adapted to provide a data connection between two or more of the plurality of transmission links 120. In some implementations, a link node of the plurality of link nodes comprises or consists of a gateway node.

In some embodiments, the telecommunication network 100 is a wired network. Moreover, in some implementations, the telecommunication network 100 is according to Ethernet standards such as IEEE 802.3. Furthermore, in some implementations, some of the plurality of link nodes are gateway nodes. For a network according to Ethernet standards, the gateway nodes are implemented as network switches, in some implementations.

In some embodiments, an originator node 112 of the plurality of originator nodes 110 is data connected to a destination node 162 of the plurality of destination nodes 160 by a path 222 through the telecommunication network 100. As illustrated in FIG. 1, the path 222 comprises a transmission link 122, a transmission link 130, a transmission link 132 and a transmission link 150, each of plurality of transmission links 120, and comprises a link node 172, a link node 174 and a link node 176, each of the plurality of link nodes. Originator node 112 is connected to link node 172 via transmission link 122. Link node 172 is connected to link node 174 via transmission link 130. Link node 174 is connected to link node 176 via transmission link 132. Link node 176 is connected to destination node 162 via transmission link 150.

Likewise, an originator node 114 of the plurality of originator nodes 110 is data connected to a destination node 164 by a path 224 through the telecommunication network 100. The path 224 comprises the transmission link 130 as well as a transmission link 124, a transmission link 134, a transmission link 144 and a transmission link 146 of the plurality of transmission links 120, wherein these transmission links 124, 130, 134, 144 and 146 are data connected respectively by one of the link nodes 172, 174, 182 and 184 of the plurality of transmission links.

As illustrated in FIG. 1, the transmission link 130 is part of the path 222 and the path 224, wherein path 222 and path 224 merge at the link node 172 or at least at the transmission link 130. (Merging of paths may also be called meeting of paths or merging/meeting of data streams—i.e. in particular, when at least two paths of at least two data streams meet/merge at a shared transmission link or link node, this may in relation to the shared transmission link/link node be called a merging/meeting of the at least two data streams.) Hence, the transmission link 130 is a shared transmission link, which is shared—at least—between the paths 222 and 224. Furthermore, the paths 222 and 224 also split at or after—i.e. in particular at the link node 174—the transmission link 130, wherein, e.g., path 222 extends along transmission link 132 and path 224 extends along transmission link 134.

In some embodiments, an originator node 116 of the plurality of originator nodes 110 is data connected to a destination node 164 by a path 226 through the telecommunication network 100. The path 226 comprises transmission links 126, 136, 140, 144 and 146 of the plurality of transmission links 120, wherein the originator node 116 is data connected to a link node 178 of the plurality of link nodes via the transmission link 126, the link node 178 is data connected to a link node 180 of the plurality of link nodes via the transmission link 136, the link node 180 is data connected to the link node 182 via the transmission link 140, the link node 182 is data connected to the link node 184 via the transmission link 144, and the transmission link 184 is data connected to the destination node 164 via the transmission link 146. As illustrated in FIG. 1, the paths 224 and 226 merge (at least) at the transmission link 144 and extend along transmission link 146. Hence, the transmission links 144 and 146 are part of both paths 224 and 226 and are shared transmission links, wherein furthermore—in view of the paths 224 and 226—transmission link 114 is also a transmission link, where paths—i.e. in particular the paths 224 and 226—merge.

In some embodiments, the originator node 116 is data connected to a destination node 166 by a path 227 through the telecommunication network 100. The path 227 comprises the transmission links 126 and 136 as well as a transmission link 148 of the plurality of transmission links 120, wherein the transmission links 126 and 136 are shared between paths 226 and 227, and wherein the transmission link 126 is a transmission link, where the paths 226 and 227 merge. Furthermore, the paths 226 and 227 split at or after transmission link 136—i.e. in particular at the link node 180 —, wherein link node 180 is data connected to the destination and node 166 via the transmission link 148.

In some embodiments, an originator node 118 of the plurality of originator nodes 110 is data connected to the destination node 164 by a path 228 through the telecommunication network 100, wherein the path 228 comprises a transmission link 128 of the plurality of transmission links 120 and the transmission link 146. As illustrated in FIG. 1, path 228 merges with the paths 224 and 226 at the link node 284 or at least at the transmission link 146, hence, also transmission link 146 is a shared transmission link, where paths merge.

In some embodiments, as illustrated in FIG. 1, the originator node 116 is data connected to the destination node 162 by a path 230 through the telecommunication network 100. The path 230 comprises the transmission links 126, 136, 140, 134, 132 and 150 as well as the link nodes 178, 180, 182, 174, 176. As can be seen, a potential data stream or data flow along the path 224 starting from the originator node 112 and a potential data stream or data flow along the path 230 starting from the originator node 116, both having the destination node 126, have a different direction of data flow with regard to the transmission link 134.

In some embodiments, as illustrated in FIG. 1, at least one, some, or all of the transmission links of the plurality of transmission links are adapted for bidirectional data flow. In some embodiments, some of the link nodes are only adapted for a data flow into one direction. Moreover, in some implementations, wherein a transmission link is adapted for bidirectional data flow, the transmission link is adapted to transmit data from a first (link) node, to which it is data connected, to a second (link) node, to which it is data connected, and to transmit data in the opposite direction—i.e. from the second node to the first node—at the same time. Hence, in some implementations the first and second link node and/or the transmission link is adapted for a full-duplex mode. Alternatively, the first and second link node and/or the transmission link may be adapted for a half-duplex mode, wherein—in particular—data is transmitted, at one time—only into one of the two directions, while at another time data may be transmitted into the respective opposite direction.

In some embodiments, the network scheduling apparatus 300 is adapted to provide, at least to the plurality of originator nodes 110, the scheduling of the transmissions by means of the communication interface 320 and the telecommunication network 100—e.g. by providing an scheduling signal. In some implementations, the network scheduling apparatus 300 is directly data connected to the plurality of originator nodes via the telecommunication network 100. This may advantageously allow to use the telecommunication network 100 for both, data transmission between originator nodes and destination nodes as well as data transmission—i.e. in particular for scheduling—between the network scheduling apparatus 300 and (at least) the plurality of originator nodes, whereby a complexity of a network structure including the telecommunication network 100 may be reduced.

In some embodiments, the network scheduling apparatus 300 comprises or consists of a gateway node.

In some embodiments, as illustrated in FIG. 1, the network scheduling apparatus 300 is adapted to provide, at least to the plurality of originator nodes 110, the scheduling of the transmissions by means of the communication interface 320 and by an additional network or communication path—i.e. by providing a scheduling signal. In some implementations, the network scheduling apparatus 300 is indirectly data connected to the plurality of originator nodes via the telecommunication network 100 or the network scheduling apparatus 300 is separately data connected to the plurality of originator nodes. In some of such implementations, the additional network or communication path may be a wireless communication path. Alternatively, in some of such implementations, the additional network or communication path may be an additional wired network. This may advantageously allow to separate data transmission between originator nodes and destination nodes from data transmission—i.e. in particular for scheduling—between the network scheduling apparatus 300 and (at least) the plurality of originator nodes, whereby a load on the telecommunication network 100 may be reduced and/or a potential disturbance may be mitigated. In some implementations, the network scheduling apparatus 300 is a network controller.

Figure 2:
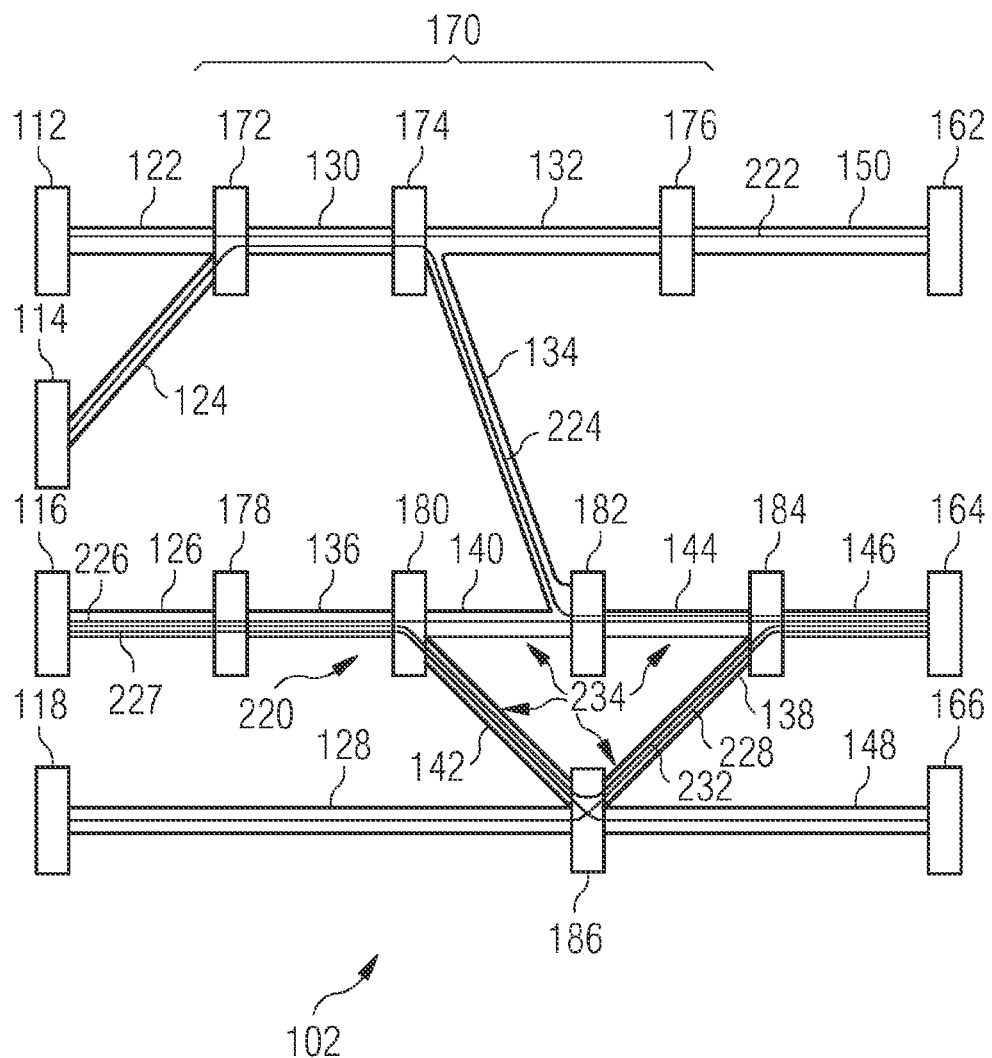
FIG. 2 schematically illustrates another telecommunication network incorporating teachings of the present disclosure.

In FIG. 2 another telecommunication network 102 is schematically illustrated. Moreover, telecommunication network 102 or parts thereof may be, e.g. a system comprising one or more originator nodes of the telecommunication network and a network scheduling apparatus or a gateway node, the network scheduling apparatus or gateway node adapted for scheduling data transmissions originating from the originator nodes.

In some embodiments, the telecommunication network 102 is similar to the telecommunication network 100, which has been described with reference to FIG. 1. Also telecommunication network 102 comprises a plurality of originator nodes, a plurality of link nodes 170 and a plurality of destination nodes, wherein—e.g.—originator nodes 112, 114, 116 and 118 of the plurality of originator nodes are data connected to destination nodes 162, 164 and 166 of the plurality of destination nodes via a plurality of transmission links and the plurality of link nodes 170.

Yet, a path from the originator node 116 to the destination node 162 is not illustrated in FIG. 2, and, accordingly, at least some implementations of the telecommunication network 102 do not comprise such a path, e.g. the transmission link 134 may be implemented as a unidirectional transmission link adapted for transmitting data from the link node 174 to the link node 182—but not in an opposite direction. Other implementations of the telecommunication network 102 may comprise such a path, yet it is not illustrated for the sake of clarity of FIG. 2.

In some embodiments, compared to the telecommunication network 100 of FIG. 1 the telecommunication network 102 of FIG. 2 further comprises a link node 186 of the plurality of link nodes 170 as well as a transmission link 138 and a transmission link 142 of the plurality of transmission links. The path 227 comprises the transmission links 126, 136, 142 and 148, wherein the transmission link 142 is data connected to the transmission link 148 via the link node 186. The path 228 comprises the transmission links 128, 138 and 146, wherein the transmission link 128 is data connected to the transmission link 138 via the link node 186.

Similar to the path 226 through the telecommunication network 100 of FIG. 1, the originator node 116 is data connected to the destination node 164 by the path 226 through the telecommunication network 102 of FIG. 2. The path 226 comprises the transmission links 126, 136, 140, 144 and 146, wherein these transmission links are respectively connected by one of the link nodes 178, 180, 182 and 184.

In some embodiments, the originator node 116 is data connected to the destination node 164 by a path 232. The path 232 comprises the transmission links 126, 136, 142, 138 and 146, wherein these transmission links are respectively connected by one of the link nodes 178, 180, 186 and 184. While paths 226 and 232 share the transmission links 126, 136 and 146, the telecommunication network 102 provides two routes from the originator node 116 to the destination node 164, e.g. as illustrated in FIG. 2, the link node 180 is data connected to the link node 184 on the one hand via transmission link 140, the link node 182 and transmission link 144 and on the other hand via transmission link 142, the link node 186 and transmission link 138. Therefore, the telecommunication network 102 comprises a loop 234.

Compared to the telecommunication network 102, the telecommunication network 100 of FIG. 1 does not comprise a loop and/or has a tree-type topology. Moreover, for a telecommunication network with a tree-type topology, a path between two of its nodes, e.g. from an originator node to a destination node, is unique. Therefore, the path between the two nodes may unambiguously be determined based on data—such as a configuration signal—indicating the two nodes. For a telecommunication network not having a tree-type topology and e.g. having a loop such as a telecommunication network 102, there may be multiple paths from one node of this telecommunication network to another node of this telecommunication network.

Figure 3:
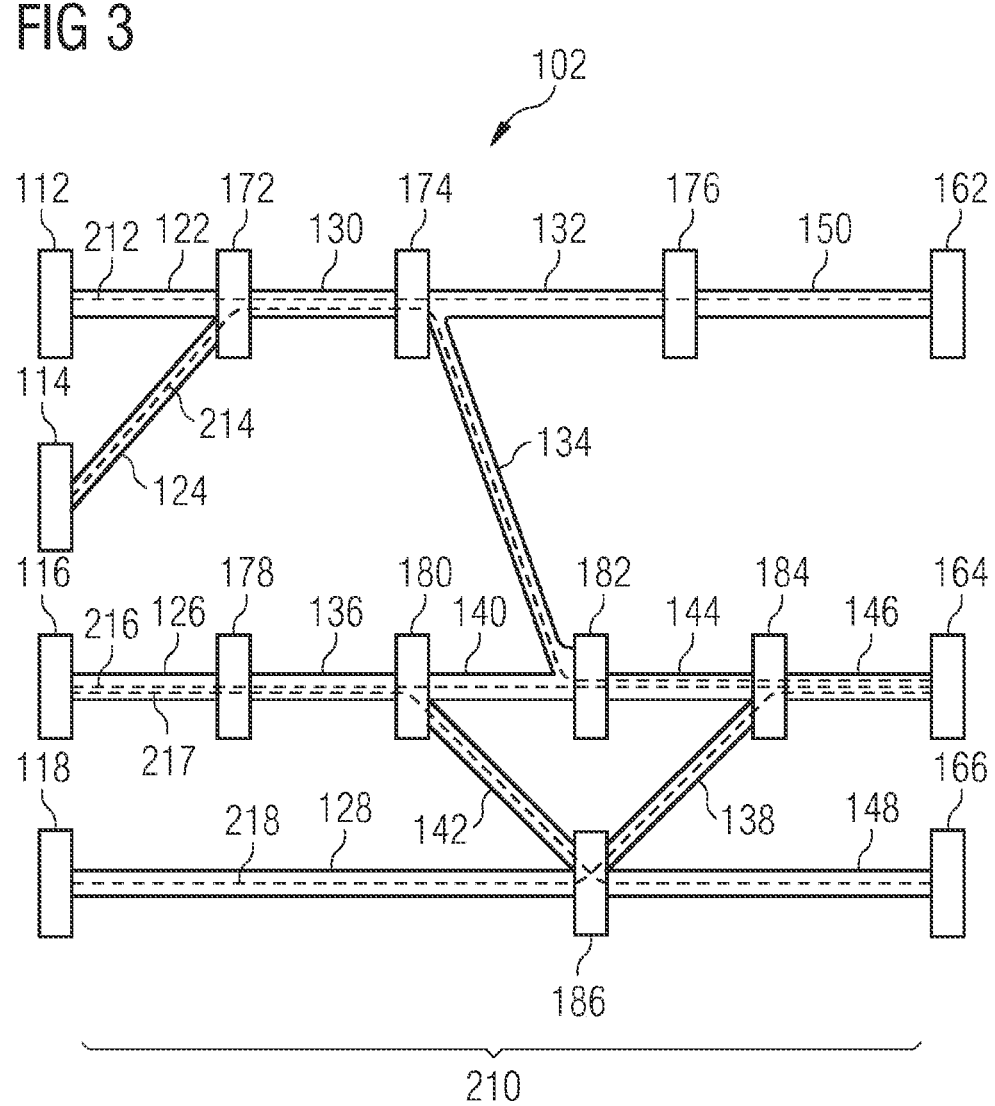
FIG. 3 schematically illustrates the telecommunication network of FIG. 2 in conjunction with a plurality of data streams incorporating teachings of the present disclosure.

FIG. 3 schematically illustrates the telecommunication network 102 of FIG. 2 in conjunction with a plurality of data streams 210 according to an embodiment of the invention.

In some embodiments, a path through the telecommunication network 102, from the originator node 112 to the destination node 162, and comprising the transmission links 122, 130, 132 and 150 and the link nodes 172, 174 and 176—e.g. the path 222 of FIG. 2—is used for transmissions of a data stream 212 of the plurality of data streams 210. In some embodiments, a path through the telecommunication network 102, from the originator node 114 to the destination node 164, and comprising the transmission links 124, 130, 134, 144 and 146 and the link nodes 172, 174, 182 and 184—e.g. the path 224 of FIG. 2—is used for transmissions of a data stream 214 of the plurality of data streams 210.

Moreover, a path through the telecommunication network 102, from the originator node 116 to the destination node 164, and comprising the transmission links 126, 136, 140, 144 and 146 and the link nodes 178, 180, 182 and 184—e.g. the path 226 of FIG. 2—is used for transmissions of a data stream 216 of the plurality of data streams 210. In some embodiments, a path through the telecommunication network 102, from the originator node 116 to the destination node 166, and comprising the transmission links 126, 136, 142 and 148 and the link nodes 178, 180 and 186—e.g. the path 227 of FIG. 2—is used for transmissions of a data stream 217 of the plurality of data streams 210.

In some embodiments, a path through the telecommunication network 102, from the originator node 118 to the destination node 164, and comprising the transmission links 128, 138 and 146 and the link nodes 186 and 184—e.g. the path 228 of FIG. 2—is used for transmissions of a data stream 218 of the plurality of data streams 210.

Figure 4:
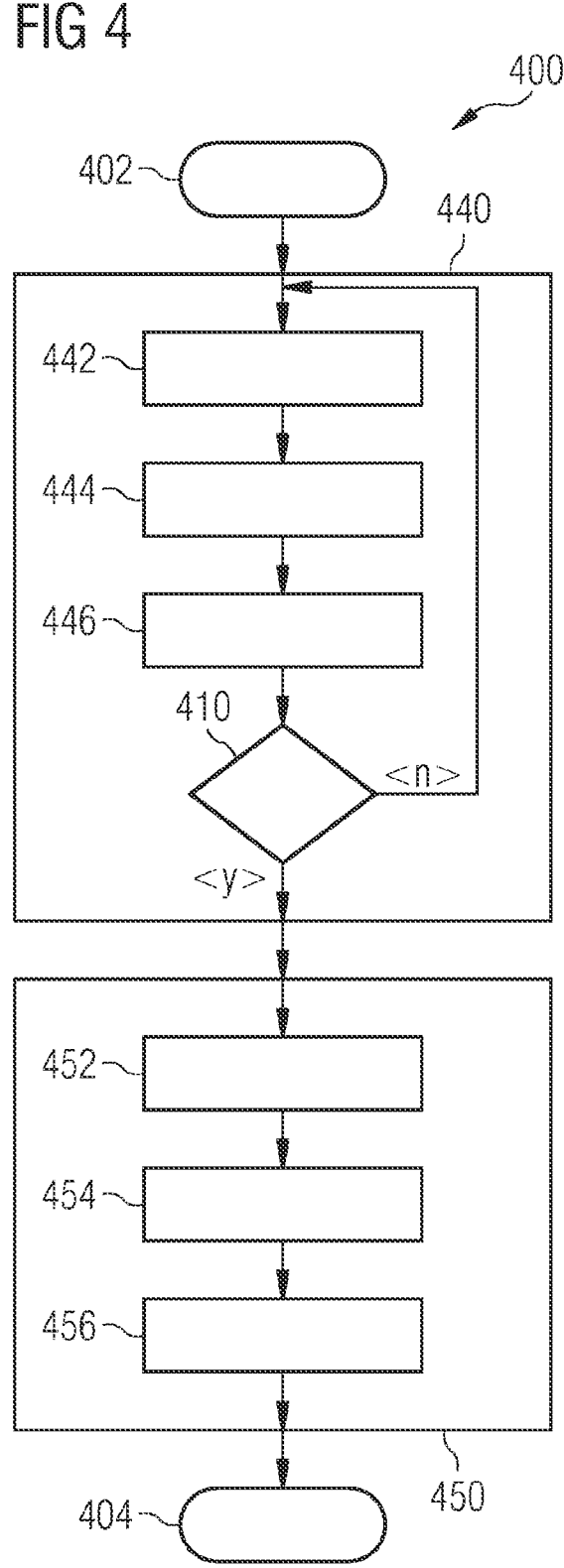
FIG. 4 represents a flowchart of a method incorporating teachings of the present disclosure.

FIG. 4 shows a flowchart of a computer-implemented method 400 for scheduling transmissions of a plurality of data streams through a telecommunication network, incorporating teachings of the present disclosure. In some embodiments, the method 400 is performed by a network scheduling apparatus or a system, the system comprising a network scheduling apparatus and one or more originator nodes. In some embodiments, a gateway node 800 described with reference to FIG. 8 or a system, the system comprising the network scheduling apparatus 300 described with reference to FIG. 1 and one or more originator nodes 112, 114, 116, 118 described with reference to FIGS. 1, 2, is adapted to perform the method 400.

In some embodiments, the method 400 comprises the method condition 410, and further comprises the method steps 440, 442, 444, 446, 450, 452, 454 and 456. The method starts at the start of the method 402 and ends at the end of the method 404. Furthermore, one or more of the method steps, in particular a sequence of method steps and/or the whole method 400 may repeatedly be performed. The telecommunication network comprises a plurality of shared transmission links, wherein each shared transmission link of the plurality of shared links is shared by at least two of the plurality of data streams.

In some embodiments, the transmissions are partitioned into transmission cycles, wherein the transmission cycles have a predetermined length in time. For each of the plurality of data streams, respective repetitive transmissions have a respective repetition rate and a respective phase. The respective repetitive transmissions of each of the plurality of data streams are transmitted, e.g. by an originator node, at a transmission cycle of the transmission cycles associated with the respective phase and are repetitively transmitted with a respective time interval between a starting of adjacent ones of respective repetitive transmissions, wherein the respective time interval is determined by the predetermined length in time of the transmission cycles multiplied by the respective repetition rate.

In some embodiments, the telecommunication network is a time sensitive network. In some other implementations the telecommunication network may at least support time synchronization for transmitting transmissions according to transmissions cycles, wherein the transmission cycles are determined based on a synchronized time. For example, in a scenario with a time sensitive network, the repetition rates may also be called reduction rates or reduction ratios and the transmission cycles may also be called network cycles.

Hence, in some implementations, sending of information—i.e. in particular, transmitting of repetitive transmissions—in a time sensitive network is cyclic, i.e. the messages—e.g. frames or repetitive transmissions—are resent in regular time intervals. These time intervals are defined to be integer multiples of the network cycle "Tn", and they determine the "Reduction Ratio (RR)" as a characteristic of every frame/repetitive transmission/data stream. So, RR=1 implies that a frame/repetitive transmission is sent in every network cycle, i.e. that the interval between its two sending is exactly one Tn. In a general case, the interval between two sending of the same repetitive transmissions of a data stream is equal to (RR*Tn). A consequence of a RR=K>1, is that the stream can be sent the first time in any of K network cycles. E.g. a stream with RR=2 could be initially sent either in the first or the second network cycle and then resent every 2*Tn after that. The choice of the network-cycle where the first sending occurs (from the available RR cycles) may be called "Phase-Allocation". When paths of individual data streams or at least shared transmission links are already determined, the phase-allocation can be used to minimize the delays caused by sharing of transmission links between data streams or repetitive transmissions thereof. When two or more data streams share the same transmission link, they can interfere with—and thus delay—each other. A worst-case delay is proportional to a number of streams sharing the same transmission link, scaled by the frame sizes of individual data streams or, respectively, the sizes of the repetitive transmissions of the individual data streams.

Some exemplary embodiments, implementations, and further modifications will be described in conjunction with references to FIGS. 1 and 2 as well as FIGS. 5 and 6, FIGS. 5 and 6 also described in the following. Yet, the exemplary embodiments, implementations and further modifications may also be used for other telecommunication networks, network scheduling apparatuses, systems comprising a network scheduling apparatus and one or more originator nodes as well as for other scenarios of data streams, repetitive transmissions, repetition rates and/or phase-allocations.

Figure 5:
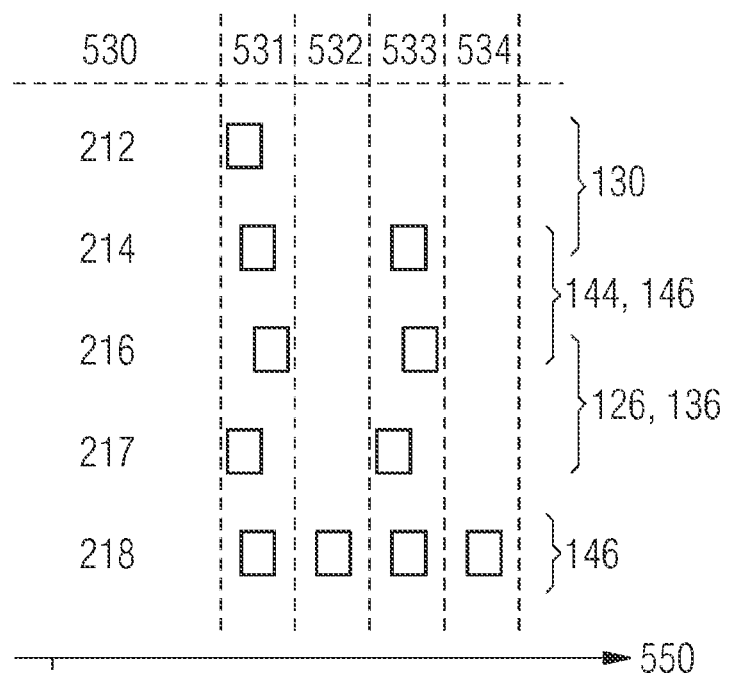
FIG. 5 schematically shows a scenario with repetitive transmissions of a plurality of data streams and their alignment to transmission cycles incorporating teachings of the present disclosure.

In FIG. 5 a scenario with repetitive transmissions of a plurality of data streams and their alignment to transmission cycles—i.e. in particular how the transmissions are partitioned in the transmission cycles—and an initial phase-allocation are illustrated.

In some embodiments, a plurality of transmission cycles 530 comprises transmission cycle 531, transmission cycle 532, transmission cycle 533, and transmission cycle 533. Repetitive transmissions of a data stream 212 have a repetition rate of 4, i.e. RR=4, and a phase of 1, i.e. Ph_start=1, so these repetitive transmissions start at the first transmission cycle 531 and are repeated every fourth transmission cycle—i.e. in particular transmissions are starting at Tn=1, 5, 9, 13, .... Repetitive transmissions of a data stream 214 have a repetition rate of 2, i.e. RR=2, and a phase of 1, i.e. Ph_start=1, so these repetitive transmissions start at the first transmission cycle 531 and are repeated every second transmission cycle—i.e. in particular transmissions are starting at Tn=1, 3, 5, 7, ....

Repetitive transmissions of a data stream 216 have a repetition rate of 2, i.e. RR=2, and a phase of 1, i.e. Ph_start=1, so these repetitive transmissions start at the first transmission cycle 531 and are repeated every second transmission cycle—i.e. in particular transmissions are starting at Tn=1, 3, 5, 7, .... Repetitive transmissions of a data stream 217 have a repetition rate of 2, i.e. RR=2, and a phase of 1, i.e. Ph_start=1, so these repetitive transmissions start at the first transmission cycle 531 and are repeated every second transmission cycle—i.e. in particular transmissions are starting at Tn=1, 3, 5, 7, .... Repetitive transmissions of a data stream 218 have a repetition rate of 1, i.e. RR=1, and a phase of 1, i.e. Ph_start=1, so these repetitive transmissions start at the first transmission cycle 531 and are repeated every transmission cycle—i.e. in particular transmissions are starting at Tn=1, 2, 3, 4, 5, 6, 7, ....

For illustrative purposes only the transmission cycle 531—i.e. in particular with Tn=1—, the transmission cycle 532—i.e. in particular with Tn=2—, the transmission cycle 533—i.e. in particular with Tn=3—, and the transmission cycle 534—i.e. in particular with Tn=4—have been illustrated. As each of the repetitive transmissions are cyclic with a respective repetition rate also overall transmissions comprising or consisting of the respective transmissions are cyclic. Furthermore, as the least common multiple of the repetition rates is 4, the overall transmissions are cyclic every fourth transmission, and hence, a transmissions cycle following the transmission cycle 534 will look—at an illustration such as FIG. 5—like transmission cycle 531, the next transmission cycle will look like transmission cycle 532 etc.

As illustrated in FIG. 3 and FIG. 5, the repetitive transmissions of the data streams 212, 214, 216, 217 and 218 may be transmitted through the telecommunication network 102, wherein the data streams 212 and 214 may share the shared transmission link 130. Moreover, the data streams 216 and 217 may originate from the same originator node 116 and share the shared transmission links 126 and 136. Moreover, the data streams 214 and 216 may share the shared transmission links 144 and 146, wherein data streams 214, 216 as well as data stream 218 share the transmission link 146 and arrive at the destination node 164, such a destination node being adapted to receive a data stream. While data streams 214 and 216 merge at transmission link 144, data stream 218 merges with data streams 214, 216 at transmission link 146. Hence, data streams 214 and 216 will not (further) delay each other or (further) interfere with each other at the shared transmission link 146 as delay/interference between them will already have occurred at the transmission link 144.

Likewise, the repetitive transmissions of the data streams 212, 214, 216, 217 and 218 may be transmitted through the telecommunication network 100 described with reference to FIG. 1, with the same transmission links being shared between the same data streams.

At method step 440, as shown in FIG. 4, based on at least one optimization, the respective phase of the respective repetitive transmissions for each data stream 212, 214, 216, 217, 218 of the plurality of data streams 210 is iteratively determined with respect to the transmission cycles 531, 532, 533 and 534. The at least one optimization has at least one objective function comprising at least one value indicative of interference at the plurality of shared links 120 between two or more repetitive transmissions of the plurality of data streams 210, wherein the interference between the plurality of data streams 210 depends on the respective repetition rate and the respective phase for each of the data streams—and in some implementations further depends on the shared transmission links.

The method step 440 comprises the method steps 442, 444 and 446 and the method condition 410, wherein—for determining the respective phases—the steps 442, 444 and 446 are iteratively performed and the method condition is iteratively evaluated. The at least one optimization may be implemented as a numerical optimization such as a gradient descent or a mixed integer linear program/solver or a combinatorial optimization, wherein possible solutions—i.e. in particular each respective phase, e.g. the phase-allocation—are iterated through—i.e. in particular by permutating over all or at least some of possible phase-allocations—or a combination thereof. In some implementations a numerical optimization may be combined with a combinatorial optimization, wherein possible shared transmission links are permutated and for each such permutation the respective phases are determined by the numerical optimization.

At method step 442, when performed in a first iteration within the method step 440, an initial phase-allocation is determined, e.g., for each of the data streams 212, 214, 216, 217, and 218 a respective (initial) phase is determined. Valid values for such a respective phase are in a range between (including) 1 and the respective repetition rate. For example, with a repetition rate RR=4 a respective phase may be 1, 2, 3 or 4. For example, for a repetition rate RR=1 only a respective phase of 1 is valid. For example, with a repetition rate RR=2 a respective phase may be 1 or 2. The respective (initial) phases may be determined based on randomly selecting respective valid value, e.g. by means of a (pseudo-) random number generator. E.g., with reference to FIG. 5 showing an initial phase-allocation, all respective phases are initialized with a value of 1, which is valid for any repetition rate greater or equal to 1.

At method step 442, when performed in a further iteration, a (further) phase-allocation is determined. For example, when the optimization is implemented as a gradient descent, the further phase-allocation may be determined by selecting such respective phases that the gradient of the at least one objective function is descended. For example, when the optimization is implemented as a combinatorial optimization, the further phase-allocation may be determined by selecting a further permutation of all valid phases. Finally, the initial or further phase-allocation and, hence, each respective (initial or further) phase of the respective repetitive transmissions for each of the data streams is the respective phase determined based on the at least one optimization at the last iteration.

At method step 444, for each of the data streams 212, 214, 216, 217 and 218 and at each of the plurality of shared transmission links 120, a respective count of repetitive transmissions from one of the data streams merging, at the respective shared transmission link, with at least a further one of the data streams is determined. Moreover, the at least one value indicative of the interference depends, for each respective shared transmission link 126, 130, 136, 144 and 146 of the plurality of shared transmission links 120, on the respective counts for the ones of the data streams merging at the respective shared transmission link.

In some embodiments, at method step 444, for each respective shared transmission link 126, 130, 136, 144 and 146, a summation of all respective counts, at the respective shared transmission link, except the respective count having a minimum value of these the respective counts is determined. In some embodiments, in some implementations, at method step 444, for each respective shared transmission link 126, 130, 136, 144 and 146, a minimum of all respective counts, at the respective shared transmission link, is furthermore determined. Determining the summation excluding the respective count having the minimum value or determining the minimum may beneficially take into account, that—as outlined above—data streams that have already (previously) merged (at a previous shared transmission link) do not further delay/interfere with each other.

In some embodiments, in which the summation/minimum is determined, at method step 444, a maximum value of each of the summations/minimums of the respective counts across the plurality of shared transmission links 120 and across a predetermined number of the transmission cycles—i.e. in particular over all cycles of the plurality of transmission cycles 530—is determined, wherein the at least one value indicative of the interference is the maximum value. This may beneficially facilitate to optimize a worst-case interference over all shared transmission links and over the predetermined number of transmission cycles. In some of such implementations, the predetermined number may be the least common multiple of all repetition rates such as "RRmax", which may beneficially limit performed calculations to such transmission cycles not being—due to transmissions being cyclic—equal to a previous transmission cycle, whereby reliability—due to this predetermined number being necessary—and/or efficiency—due to this predetermined number being sufficient—is enhanced.

In some embodiments, the at least one optimization has a further objective function comprising a further value indicative of a total interference. At method step 446 of such implementations, the total interference is determined as an aggregation of values indicative of the interference at each one of the plurality of shared transmission links 120 and across the predetermined number of the transmission cycles. In some further implementations, in which the summation/minimum is determined for each respective shared transmission link, the total interference is determined by summing over the respective summation/minimum at each of the shared transmission links. This may beneficially allow to take the total interference into account, when optimizing the phase-allocation.

While the worst-case interference may be relevant for ensuring that each of the repetitive transmissions arrives at the respective destination node within a predetermined time, e.g. within one transmission cycle/network cycle, whereby reliability of data transfer and thus e.g. of controlling a manufacturing process by such data transfer may be ensured or at least enhanced, the total interference may be relevant for a load of the telecommunication network and, e.g., a data transfer capability of the telecommunication network remaining for other data transmissions such as lower priority data streams. Having determined the worst-case interference and/or the total interference may beneficially facilitate determining buffer sizes required at link nodes, e.g. between the transmission links, e.g. for data streams with lower priority, e.g. when the repetitive transmissions of the plurality of data streams are transmitted by a cut-through operation, while transmissions of lower priority data streams are transmitted store-and-forward operation.

E.g., with reference to FIG. 5 with all repetitive transmissions having one transmission or one frame, at transmission cycle 531: the summation at shared transmission link 130 has a value of 1 (e.g. the repetitive transmissions of data streams 212 and 214 interfere, both having one transmission/frame results in a interference or delay of 1); the summation at shared transmission link 126 has a value of 1 (e.g. the data streams 216 and 217 interfere at least at transmission link 126, assuming that the originator node 126 is capable of transmitting repetitive transmissions for both data streams 216, 217 at the same time, e.g. having two network ports); the summation at shared transmission link 136 has a value of 0 (e.g. data streams 216, 217 have already interfered at a previous transmission link, e.g. at the transmission link 126); the summation at shared transmission link 144 has a value of 1 (e.g. the repetitive transmissions of data streams 214 and 216 interfere); the summation at shared transmission link 146 has a value of 2 (e.g. while the repetitive transmissions of data streams 214 and 216 interfere, the data streams 214, 216 already merged at shared transmission link 144, but now additionally the data stream 218 interferes, wherein the count of transmissions for data streams 214 and 216 is 2 and the count for data stream 218 is 1, thus the minimum value excluded from summation is 1 and the resulting summation is 2, i.e. only the count of data streams 214, 216 is taken into account, as, e.g., the additional data stream 218 delays the data streams 214, 216 by 1, wherein one of the data streams will be delayed by 2 in total, or, alternatively, data streams 214, 216 delay data stream 218 by 2).

At transmission cycle 532 there is no interference as only the repetitive transmissions of data stream 218 are transmitted, and, accordingly, the summations at all shared link nodes 130, 144, 146, 126, 136, 146 are 0. The summations at transmission cycle 533 are equal to the summations at transmission cycle 531 except at transmission link 130, because data stream 212 has a repetition rate of 4 and is not transmitted at transmission cycle 533, i.e. at transmission cycle 533 the summation at shared transmission link 130 has a value of 0. Finally, at transmission cycle 534 there is no interference and the summations are zero. So, the worst-case interference is 2. Furthermore, for implementations determining the total interference, e.g. as a further value of a further objective function, the total interference over all shared transmission links 130, 144, 146, 126 and 136 and all transmission cycles 531, 532, 533 and 534 is the sum of 5—for cycle 531—and 4—for cycle 533—i.e. the total interference is 9.

At method condition 410, it is determined whether one or more optimization criteria such as reaching the at least one objective function—i.e. in particular reaching a minimum value of the at least one value indicative of the interference—are fulfilled. In some implementations it is determined whether the worst-case interference has reached a minimal value, and whether—over all possible phase-allocations yielding the minimal worst-case interference—also the total interference has reached a minimal value. Moreover, in some implementations, it is additionally determined whether an upper limit for a number of iterations of method step 440/the at least one optimization/the further optimization has been reached. If this—or at least one of both conditions—are fulfilled—symbolized by <y>—the method step 450 is performed. Otherwise, i.e. the one or more optimization criteria not being met and, possibly, the upper limit for the number of iterations not being reached, —symbolized by <n>—the method is continued at method step 442 for a further iteration.

Figure 6:
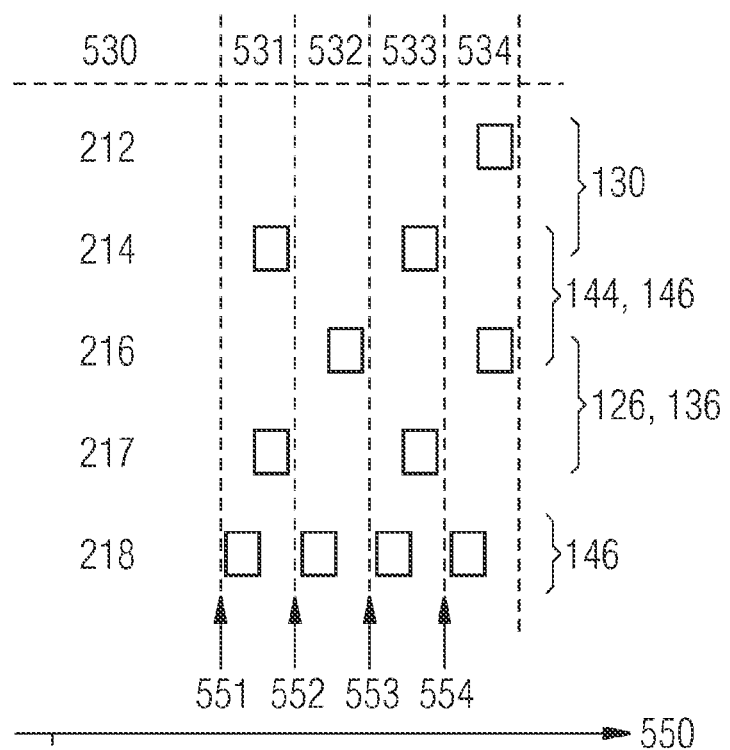
FIG. 6 schematically shows the scenario of FIG. 5, wherein respective phases have been determined by an optimization incorporating teachings of the present disclosure.

FIG. 6 illustrates the scenario of FIG. 5, wherein the phase-allocation—i.e. in particular the respective phases—have been determined by an optimization. For example, the respective phases may be determined by method step 440 described with reference to FIG. 4.

In some embodiments, the repetitive transmissions of data stream 212 (now) have a phase of 4. The repetitive transmissions of data stream 214 (now) have a phase of 1. The repetitive transmissions of data stream 216 (now) have a phase of 2. The repetitive transmissions of data stream 217 (now) have a phase of 1. The repetitive transmissions of data stream 218 (still) have a phase of 1 (being the only valid value). So, with all repetitive transmissions having one transmission or one frame, at all transmission cycles 531, 532, 533, 534: the summation at shared transmission link 130 has a value of 0; the summation at shared transmission link 126 has a value of 0; the summation at shared transmission link 130 has a value of 0; the summation at shared transmission link 136 has a value of 0; the summation at shared transmission link 144 has a value of 0; and the summation at shared transmission link 146 has a value of 1. Hence, e.g., all interferences between the data streams have been avoided except the interferences occurring between data stream 218 and data streams 214 or 216. So, the worst-case interference is 1 and the total interference is 4.

As can be seen in FIG. 6, the repetitive transmissions have been distributed over the transmission cycles, whereby the worst-case and/or the total interference may beneficially be reduced. Moreover, also other phase-allocations such as data stream 212 having a respective phase of 2 will result in the worst-case interference being 1 and the total interference being 4. Moreover, e.g. the data stream 212 having a respective phase of 1 would result in the worst-case interference still being 1, but would increase the total interference to 5.

At method step 450, as shown in FIG. 4, the respective repetitive transmissions of each of the plurality of data streams 210 are scheduled in accordance with the respective phase. Hence, in some implementations, an optimization algorithm—such as the determining of the phases based on the at least one optimization—distributes data streams over phases to minimize sharing of transmission links, e.g. transmission links where data streams merge. If a maximum of the repetition rates of all streams is RRmax, it is enough to analyze a stream sharing, e.g. interference, in RRmax network cycles, as, e.g., the overall transmissions are cyclic every RRmax network cycles. The at least one optimization will select the phase-allocation so that the distribution of link sharing (which means the worst-case delay due to interference) over these cycles is optimal with respect to a predefined criterion. In some further implementations, the predefined criterion is to minimize the maximum interference over these RRmax cycles, and possibly—i.e. based on a further objective function—also to reduce total number of overlaps over all RRmax cycles.

In some implementations such as implementations being performed by a system comprising a network scheduling apparatus 300 and one or more originator nodes 112, 114, 116 and 118, the method step 450 comprises the method steps 452, 454 and 456.

In some embodiments, the method steps 440 and 450 or (at least) the method steps 440 and 452 are performed by a network scheduling apparatus such as a gateway node.

In some embodiments, the method steps 454 and 456 are performed by one or more originator nodes—i.e. in particular each of the one or more originator nodes may perform method steps 454 and 456.

At method step 452, each of the respective repetitive transmissions are scheduled by providing a scheduling signal to the one or more originator nodes, the scheduling signal comprising the phases, or by providing a respective scheduling signal to each one of the one or more originator nodes, each respective scheduling signal comprising the respective phase.

At method step 454, the scheduling signal or the respective scheduling signal is received, e.g. by the respective originator node of the one or more originator nodes.

At method step 456, the respective repetitive transmissions are transmitted in accordance with the scheduling signal or the respective scheduling signal, and e.g. in accordance with the respective phase and repetition rate.

In some embodiments, in which the method 400 is performed by a network scheduling apparatus such as a gateway node, the gateway node performs step 450 by restricting transmission of repetitive transmissions to such repetitive transmissions that are according the phase-allocation—i.e. in particular the respective repetition rate and phase. In some advantageous modifications, other repetitive transmissions may be stored—i.e. in particular buffered—and sent at a later transmission cycle according to the phase-allocation and/or an error signal may be sent to the respective originator node.

Figure 7:
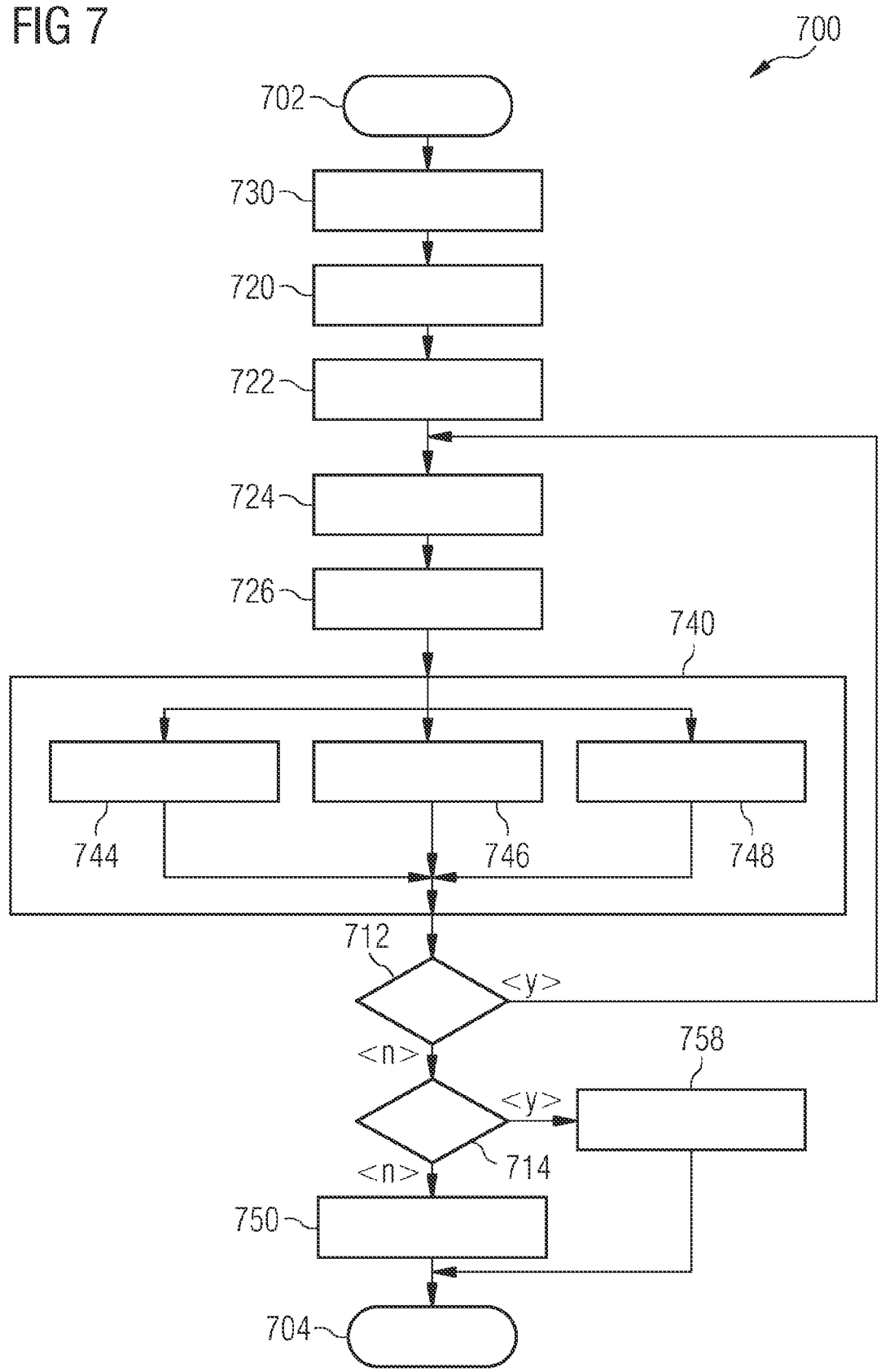
FIG. 7 represents a flowchart of another method incorporating teachings of the present disclosure.

FIG. 7 shows a flowchart of a computer-implemented method 700 for scheduling transmissions of a plurality of data streams through a telecommunication network, incorporating teachings of the present disclosure. In some embodiments, the method 700 is performed by a network scheduling apparatus or a system, the system comprising a network scheduling apparatus and one or more originator nodes, incorporating teachings of the present disclosure.

In some embodiments, a gateway node 800 described with reference to FIG. 8 or a system, the system comprising the network scheduling apparatus 300 described with reference to FIG. 1 and one or more originator nodes 112, 114, 116, 118 described with reference to FIGS. 1, 2, is adapted to perform the method 700 incorporating teachings of the present disclosure. Moreover, the method 700 is in some exemplary embodiments similar to the method 400 described with reference to FIG. 4. Hence, details e.g. about the telecommunication network will not be repeated, but regarding such details reference is made to the details given above, e.g. with reference to FIG. 4 or also FIG. 1, 2, 3, 5 or 6.

In some embodiments, the method 700 comprises the method conditions 712 and 714, and further comprises the method steps 720, 722, 724, 726, 730, 740, 744, 746, 748, 750 and 758. The method starts at the start of the method 702 and ends at the end of the method 704. Furthermore, one or more of the method steps, in particular a sequence of method steps and/or the whole method 700 may repeatedly be performed.

At method step 730 at least one configuration signal is received, wherein the at least one configuration signal is indicative of the repetition rates of the repetitive transmissions of the plurality of data streams 210 and wherein the repetition rates are restricted to integer powers of two—e.g. 1, 2, 4, 8, 16 etc.

At method step 720, at least one configuration signal is received, wherein the at least one configuration signal is indicative of an at least one of the plurality of data streams 210, an at least one originator node and an at least one destination node. Moreover, the at least one originator node 112, 114, 116, 118 is adapted to transmit respective repetitive transmissions of the at least one 212, 214, 216, 217, 218 of the plurality of data streams 210, and the at least one destination node 162, 164, 166 is adapted to receive the respective repetitive transmissions of the at least one of the plurality of data streams 210.

In some embodiments, the at least one configuration signal of step 730 and the at least one configuration signal of step 720 are one combined configuration signal or are at least received together, wherein the combined configuration signal or both at least one configuration signals are respectively received from each one of the originator nodes, wherein they a indicative of the respective data stream, the respective repetition rate, the respective originator node and a respective destination node.

In some embodiments, the at least one configuration signal of step 730 and/or the at least one configuration signal of step 720 are (e.g. as a combined signal) received from another node of the telecommunication network 100, 102 or from an external device such as a configuration device for externally setting up a scheduling configuration.

At method step 722, topology data being indicative of a topology of the telecommunication network 100, 102 is established. In some implementations, the topology data is determined by means of a measurement protocol, wherein topology detection network packages are transmitted and according replies are received. In some implementations, the topology data is determined by retrieving the topology data from a topology data base.

At method step 724, a respective path 222, 224, 226, 227, 228—e.g. in a first iteration—or a further respective path 232—e.g. in a further iteration —, from the at least one originator node to the at least one destination node, for the at least one of the plurality of data streams 210 and through the telecommunication network 100, 102 and being used for the respective repetitive transmissions of the respective data stream is determined.

In some embodiments, instead of method steps 722 and 724 outlined above, the at least one configuration signal of method step 720 may already comprise the paths 222, 224, 226, 227, 228, whereby the paths are determined by retrieving them from the at least one configuration signal; hence, the paths may be determined by method step 720 and, according some of such modifications, method 700 does not comprise method steps 722 and 724.

As the telecommunication network 100 has, e.g., a tree-type topology, the paths for the data streams are uniquely determined by the data streams or by a respective originator node and a respective destination node of each of the data streams. As the telecommunication network 102 comprises, e.g., a loop 234, some of the data streams may use different paths, wherein for such data streams respective paths may be predetermined, e.g. by an at least one configuration signal, or may be determined by the method 700, e.g. as part of an optimization, wherein one of the different paths is selected based on optimization criteria. For example, the repetitive transmissions of data stream 216 may be transmitted by path 226 and may also be transmitted via path 232.

At method step 726, a plurality of shared transmission links 120 is determined based on a comparison of the paths 222, 224, 226, 227, 228 or 232 through the telecommunication network 100 or 102, wherein each of shared transmission links 126, 130, 136, 144, 146 is part of at least two of the paths.

At method step 740, a respective phase of the respective repetitive transmissions for each of the plurality of data streams 210 is iteratively determined based on a numerical optimization, wherein the numerical optimization is implemented using a mixed integer linear program. The numerical optimization has an objective function comprising at least one value indicative of interference between two or more repetitive transmissions of the plurality of data streams.

Moreover, the numerical optimization takes into account, as upper limits, a worst-case arrival time, a worst-case delay and a worst-case aggregate total travelling time, wherein the worst-case arrival time is primarily optimized—e.g. minimized —, and—within optimized values for the phases for an optimal worst-case arrival time—the worst-case delay, and then the worst-case aggregate total traveling time is optimized—e.g. minimized. Hence, the at least one value indicative of the interference is based on a worst-case arrival time of the respective repetitive transmissions of each of the plurality of data streams.

In some embodiments, the objective function comprises a first further value based on a worst-case delay of the respective repetitive transmissions of each of the plurality of data streams. Furthermore, the objective function comprises a second further value based on an aggregate total travelling time, the aggregate total travelling time being an aggregation of each of the values of the total traveling times of the respective repetitive transmissions of each of the plurality of data streams.

In some embodiments, the numerical optimization takes at least the worst-case arrival time into account as an upper limit, wherein the at least one value indicative of the interference is based on a weighted average of the worst-case arrival time of the respective repetitive transmissions of each of the plurality of data streams and the aggregate total travelling time. Moreover, e.g. for the numerical optimization optimizing a worst-case scenario, the objective function is evaluated and, accordingly, the at least one value and the first further value and the second further value are determined for a predetermined number of transmission cycles, wherein—due to the repetition rates being integer powers of two—the predetermined number is determined by selecting the maximum value of the repetition rate. Restricting the repetition rates to integer powers of two beneficially allows to use the maximum value of them as a predetermined number, wherein after this predetermined number overall transmissions of the repetitive transmissions are cyclic. Furthermore, the least common multiple being the maximum value of the repetition rates beneficially reduces the predetermined number, and thus an amount of required calculations, compared to other scenarios, where the repetition rates are not restricted to integer powers of two.

Method step 740 comprises the method steps 744, 746 and 748, wherein the method steps 744, 746 and 748 are iteratively performed for the numerical optimization until one or more optimization criteria such as the objective function reaching—e.g. being below—one of, some of or all of the upper limits and/or until a maximum number of iterations has been reached. In some implementations, the iterating and/or the criteria are similar to the ones given with reference to FIG. 4. In some implementations, a mixed integer linear solver is used for the numerical optimization, wherein the objective function is provided as a linear objective function.

In some embodiments, wherein e.g. the telecommunication network is a time sensitive network, messages—i.e. in particular data transmissions—with different priorities use the same telecommunication network simultaneously and their interaction can be handled in different ways. However, any time sensitive network has to guarantee that high priority frames/transmissions such as the repetitive transmissions arrive within the network cycle in which they are sent. For that reason, in some of such implementations other frames/data transmissions—i.e. data transmissions having a lower priority—are preempted, making interference between high-priority data streams one of the primary causes of delay for these frames/data transmissions/repetitive transmissions of the data streams. By employing a MILP (Mixed Integer Linear Programming) optimization model—e.g. a mixed integer linear program or a mixed integer linear solver —, that may be used to minimize a latest arrival time of any high-priority data transmission—such as the repetitive transmissions—in any of the transmission cycles (e.g. in the context of the time sensitive network, any of the network cycles).

A MILP optimization model may facilitate guaranteeing that all frames/repetitive transmissions arrive in time, wherein, e.g., a deterministic scheduling may be implemented based on the solution for the respective phases determined based on the MILP optimization model. By this solution an efficient phase-allocation may be provided, whereby more network capacity such as bandwidth remains for other stream types or a data transmissions—e.g. data transmissions with a lower priority. Moreover, an advantage of a MILP solver—e.g. a mixed integer linear solver—may particularly be that such as solver is guaranteed to find the optimal solution; hence, on the one hand, when the phases are determined for the linear objective function based on the numerical optimization—i.e. by mixed integer linear programming/the mixed integer linear solver —, these phases are guaranteed to be optimal, while on the other hand, if no solution is found or of the one or more upper limits cannot be fulfilled, it is also guaranteed that there is no solution, e.g. no phase allocation—given the repetition rates, the network topology etc.—that would fulfil the upper limits and/or sufficient respective phases, which may, e.g., facilitate taking appropriate actions such as increasing the network capacity. Moreover, an advantage of a MILP solver may particularly be that it is more efficient compared to general nonlinear solvers, whereby the method 700 or at least a part of it, e.g. the numerical optimization, may be performed on an apparatus with limited computing resources such as some embodiments of a gateway node or a network controller.

At method step 744, a respective total traveling time of the respective repetitive transmissions of each of the plurality of data streams 210 is determined, wherein the respective total travelling time depends on one or more transmission delays encountered along the respective path 222, 224, 226, 227, and 228; or 232 and depends on the interference between the respective repetitive transmissions and other repetitive transmissions of the plurality of data streams 210. Furthermore, the worst-case arrival time is determined by selecting the maximum of each of the respective total travelling times including an interference at a respective originator node 112, 114, 116, 118 and by selecting the maximum over the predetermined number of transmission cycles.

At method step 746, the worst-case delay is determined by selecting the maximum of each of the respective total travelling times excluding an interference at a respective transmission node 116 and over the predetermined number of transmission cycles.

Hence, as can be seen with reference to FIGS. 1 and 2, the repetitive transmissions of data streams 216 and 217 interfere already at the transmission link 126 or already at the originator node 116, and, therefore, by this interference the respective total traveling and a worst-case arrival time is increased; yet, as one of these repetitive transmissions cannot be transmitted before the other one has been transmitted, it is not delayed by this interference relative to the point in time, when it is transmitted—e.g. by this interference the respective worst-case delay is not increased.

At method step 748, the worst-case aggregate total travelling time is determined by determining a respective aggregate total travelling time for each of the transmission cycles by summing over, for each of the data streams, the total traveling times for the respective transmission cycle, and then selecting the respective aggregate total travelling time of the respective transmission cycle, where the respective aggregate total travelling time has a maximum value, as the worst-case aggregate total traveling time.

At method condition 712, it is determined—e.g. in a scenario with a telecommunication network 102 that does not have a tree-type topology and/or that has a loop 234—whether a further path may be selected for one of the plurality of data streams. If this is the case—symbolized by <y>—, the method 700 is continued at method step 724. Otherwise—symbolized by <n>—the method 700 is continued at method condition 714.

Hence, e.g. referring to FIGS. 2 and 3, when continuing the method at method step 724 for a further iteration, for the data stream 216 the path 232 may be selected as a further path (e.g. instead of the path 226, which may have been selected in a first iteration for the data stream 216). Thereby, an interference at the link node 182 or at the transmission link 144 may be reduced, yet the interference at the link node 184/the transmission link 146 remains. For a scenario, where the transmission link 144 has a lower bandwidth than transmission link 146 and therefore is a bottleneck with regard to the repetitive transmissions of data streams 214 and 216, a routing via the path 232 may be beneficial and, e.g., reduce the worst-case arrival time.

At method condition 714, it is determined whether the numerical optimization fails to meet at least one of the upper limits, wherein the phases as selected from the numerical optimization, in which the selected paths result in the lowest values for the at least one value, possibly the first further value, and possibly the second further value. If the numerical optimization fails to meet at least one of the upper limits—symbolized by <y>—, method step 758 is performed. Otherwise—symbolized by <n>—, method step 750 is performed.

At method step 758, a warning signal is provided—e.g. to one or more of the originator nodes.

At method step 750, the respective repetitive transmissions of each of the plurality of data streams 210 are scheduled, wherein the respective repetitive transmissions start at a transmission cycle associated with the respective phase.

In some embodiments, the method 400 may be combined with the method 700. In some implementations, the method 400 may comprise method step 730. In some implementations, the method 400 may comprise method steps 720, 722, 724 and 726 as well as method condition 712—e.g. for selecting one or more further paths and further optimizing by selecting paths. In some implementations, the method 400 may comprise method condition 714 and method step 758—e.g. for providing a warning signal. In some implementations, the method 700 may implement method step 750 similar to method step 450—e.g. for scheduling the repetitive transmissions by providing a scheduling signal to the originator nodes.

In some embodiments, the objective function is provided as a linear objective function and the numerical optimization is performed based on the following: For the respective phase of each data stream, a binary variable is defined. This may be an array of binary values and may be described based on a pseudocode resembling AMPL (A Mathematical Programming Language, see e.g. https://en.wikipedia.org/wiki/AMPL).

var streamToPhase {stream in streams( ), rr in 0 . . . stream.RR( )−1} binary;

As each data stream or more particular the respective repetitive transmissions of each of the data streams have exactly one phase, according to which they are transmitted, a constraint may be defined in the pseudocode.

choose_one_phase_per_stream {stream in streams( )}: sum{rr in 0 . . . stream.RR( )−1} streamToPhase [stream, rr]=1;

Moreover, an interaction of different data streams and phases—e.g. the interference between the repetitive transmissions of the data streams depending on the repetition rate and the phases—is modelled. For that, a variable holding the worst case delay of a stream which could result from being delayed by other data streams is established. The worst-case delay depends on the sizes of the repetitive transmissions—e.g. the frame sizes—and is computed as the sum of all frame sizes of data streams which share at least one transmission link with the respective data stream and are assigned to the same phase.

var DelayCausedByInterferingStreams{stream in streams( )}>=0;
define_delay_caused_by_InterferingStreams{stream in streams( ), rr in 0 . . . stream.RR( )−1}:
streamToPhase[stream, rr]=1→DelayCausedByInterferingStreams[stream]>=sum{intersecting_idx in intersectingStreams(stream)}
(sum{other_rr in 0 . . . stream(intersecting_idx).RR( )−1: other_rr mod stream.RR( )=rr mod stream(intersecting_idx).RR( )}streamToPhase[stream(intersecting_idx)][other_rr])*stream(intersecting_idx).interferenceDelay( );

The respective total travelling time and the worst-case arrival time depend, besides the interference taken into account, as outlined above, also on the one or more transmission delays encountered along the respective path—such as transmission delays over cables or transmission delays through link nodes or transmission delays through bridges. All the delays may be summed up for determining the total traveling time. This may be taken account by defining the following variables and constraints.

var streamDelay {stream in streams( )}>=0;
var maxStreamDelay>=0;
subject to defind_stream_delay{stream in streams( )}:
streamDelay[stream]>=DelayCausedByInterferingStreams[stream]+
phaseIndependentDelay(stream);
subject to define_max_interference{stream in streams( )}:
maxStreamDelay>=streamDelay[stream];

Finally, the worst-case arrival time is determined and optimized, the worst-case arrival time being in the maximum delay of repetitive transmissions of one of the data streams. In the pseudocode this may be performed by the following:

minimize worst_case: maxStreamDelay;

Such implementations described above in conjunction with the pseudocode do not rely on the repetition rates/reduction ratios being integer powers of two. Hence, such implementations may also be used for more general embodiments and/or for the at least one optimization by a numerical optimization at method step 440 of method 400.

In some embodiments, wherein the repetition rates are integer powers of two, the objective function is provided as a linear objective function and the numerical optimization is performed based on the following as described in conjunction with pseudocode resembling AMPL (A Mathematical Programming Language, see e.g. https://en.wikipedia.org/wiki/AMPL Taking advantage of the repetition rates being integer powers of two, the phases may be defined by the following variables, which use a binary representation:

var streamToPhaseInBin {stream in streams( ), rr in 0 . . . stream.log 2RR( )−1} binary;

For example, a data stream t with a repetition rate RR=8 may have a binary representation requiring three binary variables corresponding to $2^0$, $2^1$ and $2^2$. When an (initial) phase of Ph=7 (or Ph_initial=7) is assigned to that stream, the binary variables would be set to streamToPhaseInBin[t, i]=1 for i=0, 1, 2
        e.g. (since 7=2^0+2^1+2^2).

In some embodiments, two data streams are possibly sent at the same transmission cycle, if the binary variables (as defined above) for one of the two data streams with a smaller repetition rate are identical to the corresponding binary variables for the other one of the two data streams. For example, when one of the two data streams is the data stream t and the other one is a data stream s, wherein the data stream s has a repetition rate RR=4 and a phase of 3, the binary variables for data stream s would be set to streamToPhaseInBin[s, i]=1 for i=0, 1
        e.g. (since 3=2^0+2^1). Hence, when the data streams t and s share a transmission link, they may interfere at the transmission link—i.e. the shared transmission link—at transmission cycle 7 (and 15, 23, . . . ).

While in the above described implementations not requiring repetition rates of integer powers of two, the interference occurring only at the shared transmission links has been taken into account due to the representation of the face allocation (i.e. by "var streamToPhase") and the summing over the frame sizes, in the implementations outlined here and requiring the repetition rates being integer powers of two, interference on the acquiring at the shared transmission links is taken into account by the following pseudocode:

var phaseBinaryDiffNonNegative {stream in streams), otherstream_idx in intersectingStreams (stream)} binary;
    var phaseBinaryDiffNonPositive {stream in streams( ), otherstream_idx in intersectingStreams (stream)} binary;

So, based on the following pseudo-code, which may define boundary conditions, the variable "phaseBinaryDiffNonPositive"—i.e. in particular a respective binary variable for each (data) stream of the (data) streams and for each further stream of the streams that are sharing a transmission link or merging a transmission link—is (e.g. set by the boundary conditions to be) greater than 0, if the difference is smaller or equal to 0.

checkPhaseBinaryDiff1{stream in streams( ), otherstream_idx in intersectingStreams(stream)}:
    sum{i in 0 . . . min(stream.log 2RR( ), stream(otherstream_idx).log 2RR( ))−1}(streamToPhaseInBin [stream, i]−streamToPhaseInBin[stream(otherstream_idx), i])*2+stream.RR( )*phaseBinaryDiffNonPOsitive[stream, otherstream_idx]>=1;

Likewise, based on the following pseudo-code, which may define boundary conditions, the variable "phaseBinaryDiffNonNegative" is greater than 0, if the difference is greater or equal to 0.

checkPhaseBinaryDiff2{stream in streams( ), otherstream_idx in intersectingStreams(stream)}:
    sum{i in 0 . . . min(stream.log 2RR( ), stream(otherstream_idx).log 2RR( ))−1}(streamToPhaseInBin [stream, i]−streamToPhaseInBin[stream(otherstream_idx), i])*2−stream.RR( )*phaseBinaryDiffNonNegative[stream, otherstream_idx]<=−1;

Based on this, interfering data streams are determined based on the following pseudocode:

var streamsInterfere {stream in streams( ), otherstream_idx in intersectingStreams(stream)}binary;
    compute_intersection_in_phase {stream in streams( ), otherstream_idx in intersectingStreams (stream)}:
    streamsInterfere[stream, otherstream_idx]>=phaseBinaryDiffNonPOsitive [stream, otherstream_idx]+phaseBinaryDiffNonNegative[stream, otherstream_idx]−1;

Finally, a linear model similar to the model given above is constructed and minimized.

In some embodiments, requiring the repetition rates being integer powers of two may particularly be that a number of variables, in particular the number of binary variables may be reduced compared to the more general implementations given above. For example, the number of the variables for "streamToPhase" of the more general implementations given above have to be equal to the maximum value of the repetition rates multiplied by the number of data streams (i.e. (number of data streams)*max(repetition rates)), whereas for the implementations requiring repetition rates being integer powers of two—due to the binary representation—the number of the variables for "streamToPhaseInBin" is the logarithm with a base of two of the maximum value of the repetition rates (still) multiplied by number of data streams (i.e. (number of data streams)*log 2(max (repetition rates))).

Therefore, e.g., the more general implementations given above scale linearly with the repetition rates—e.g. with a maximum of the repetition rates —, while the (more sophisticated) implementations (requiring the repetition rates being integer powers of two) scale logarithmically. Hence, the more sophisticated implementations are computationally more efficient, e.g. when repetition rates with higher values are used—e.g. repetition rates greater or equal to 32 or 512. When, e.g., only repetition rates are used with lower values—e.g. values up to 10—, the more general implementations may beneficially be more efficient, because the constraint of interference only occurring at shared transmission links does not have to be computed as an additional constraint.

Similar to the implementations given above, which minimized the worst-case arrival time, the worst-case a delay may be optimized by determining the occurring interferences at the shared transmission links and nodes except the respective originator node.

Figure 8:
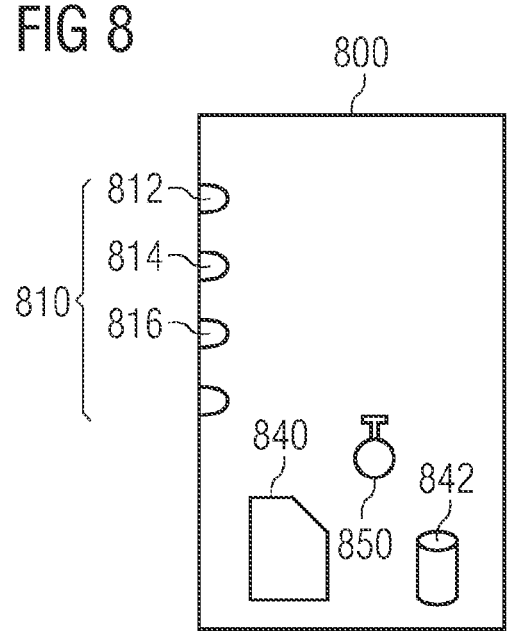
FIG. 8 schematically illustrates a gateway node incorporating teachings of the present disclosure.

In FIG. 8 a gateway node 800 incorporating teachings of the present disclosure is schematically illustrated. In some embodiments, the gateway node 800 comprises a data processing apparatus 840, a topology database 842 adapted to store and retrieve topology data of a telecommunication network, a clock device 850 adapted to provide a time synchronization signal to the telecommunication network, and a plurality of network ports 810 comprising the network ports 812, 814, 816. The network ports of the plurality of network ports 810 are respectively adapted to establish a data connection between a node of the telecommunication network—e.g. one of the originator nodes 112, 114, 116 or 118—and the gateway node 800 via a transmission link—e.g. one of the plurality of transmission links 120.

Furthermore, the gateway node 800 is adapted to perform by means of the data processing apparatus 840 the method 700. In some embodiments, the network scheduling apparatus 300 and/or the gateway node 800 is a central network controller, wherein the central network control comprises a data storage with all planned, possible or determined paths through the network for all data streams and or repetition rates and further parameters of the telecommunication network such as the network topology or transmission delays due to delays over cables, over bridges, over switches, over gateway nodes etc.

Figure 9:
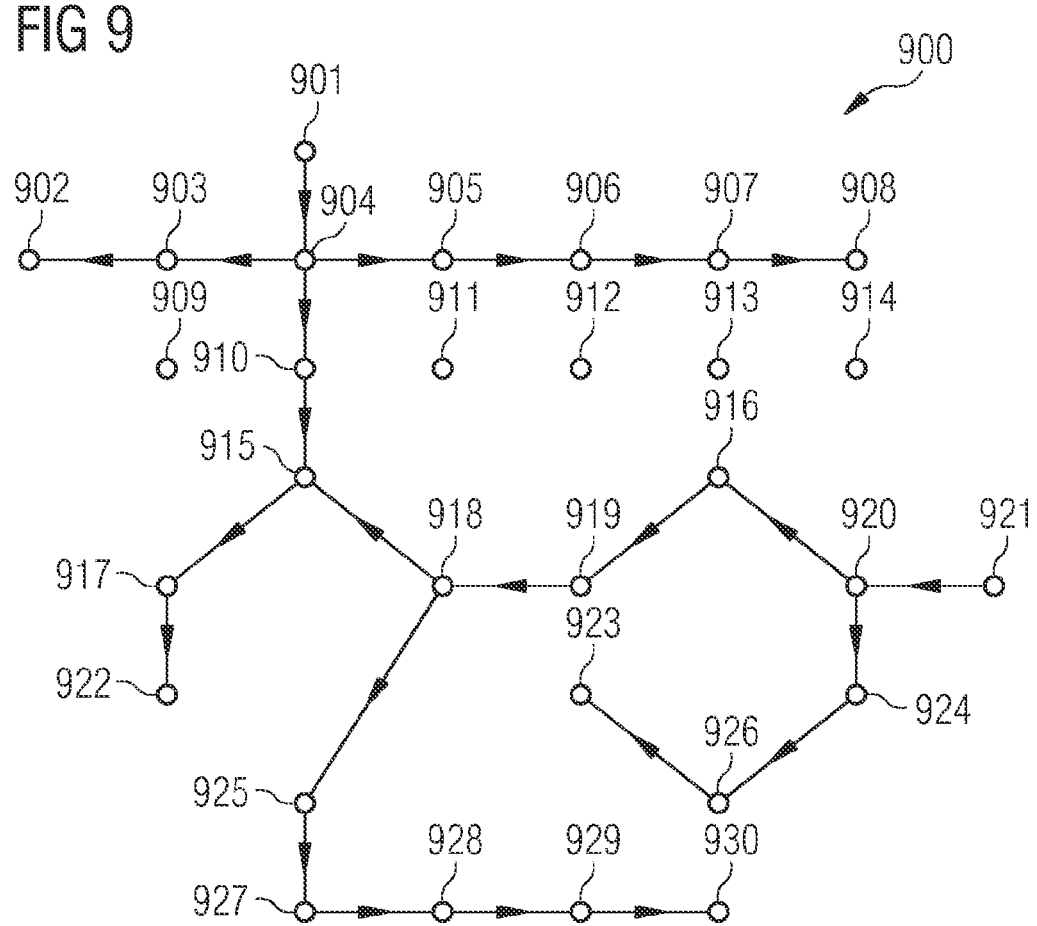
FIG. 9 schematically illustrates yet another telecommunication network for elucidating an optimization and determining of respective phases incorporating teachings of the present disclosure.

In FIG. 9 yet another telecommunication network 900 is schematically illustrated for elucidating an optimization and determining of respective phases according to an embodiment of the invention. In some embodiments, the telecommunication network 900 comprises the nodes 901, 902, 903, 904, 905, 906, 906, 907, 908, 909, 910, 911, 912, 913, 914, 915, 916, 916, 917, 918, 919, 920, 921, 922, 923, 924, 925, 926, 926, 927, 928, 929, and 930.

In an exemplary case, the node 901 and node 921 are each an originator node, e.g. a controller device such as a ProfinetIRT-controller. The controller device 901 sends two messages, e.g. repetitive transmissions, to each of the nodes 902, 908 and 930—these nodes being destination nodes 902, 908 and 930—, wherein each one of the destination nodes 902, 908 and 930 receives one message of the two messages with a repetition rate of RR=2 and the other one of the two messages with a repetition rate of RR=4. The second controller device 921 communicates with the nodes 922, 923 and 930—these nodes being destination nodes 922, 923 and 930—and also sends one message with RR=2 and one with RR=4 to each destination, i.e. destination nodes 922, 923 and 930. Hence, the number of established data streams pro controller is 6, which means 12 in total for the whole network.

As can be seen from FIG. 9, the telecommunication network has a tree-type topology. The overlap—e.g. possible interference—between streams exists in the transmission links (also called "links" for brevity) attached to the controller devices 901, 921 (also called "controllers" for brevity), and also in the overlap of data stream from both controllers to the node 930. This overlap starts in the link between the (link) nodes 918 and 925.

Each of the plurality of data streams is defined by its sender-receiver-pair (i.e. the respective originator node and the respective destination node), its respective repetition rate RR and its respective path:

Stream1: Sender=901; Receiver=902; RR=2; Path=[901 904 903 902];
Stream2: Sender=901; Receiver=908; RR=2; Path=[901 904 905 906 907 908];
Stream3: Sender=901; Receiver=930; RR=2; Path=[901 904 910 915 918 925 927 928 929 930];
Stream4: Sender=901; Receiver=902; RR=4; Path=[901 904 903 902];
Stream5: Sender=901; Receiver=908; RR=4; Path=[901 904 905 906 907 908];
Stream6: Sender=901; Receiver=930; RR=4; Path=[901 904 910 915 918 925 927 928 929 930];
Stream7: Sender=921; Receiver=922; RR=2; Path=[921 920 916 919 918 915 917 922];
Stream8: Sender=921; Receiver=923; RR=2; Path=[921 920 924 926 923];
Stream9: Sender=921; Receiver=930; RR=2; Path=[921 920 919 918 925 927 928 929 930];
Stream10: Sender=921; Receiver=922; RR=4; Path=[921 920 916 919 918 915 917 922];
Stream11: Sender=921; Receiver=923; RR=4; Path=[921 920 924 926 923];
Stream12: Sender=921; Receiver=930; RR=4; Path=[921 920 919 918 925 927 928 929 930];

The shared transmission links may be represented by a matrix having a column for each data stream of the plurality of data streams in a row for each transmission link, wherein each of the transmission links is indicated by a first link node (link begin) and a second link node (link end), wherein the first and the second link node are data connected by the respective transmission link. Hence, a matrix M may be constructed by first identifying the links contained in the paths of all streams, and then indicating streams which share these links, wherein an entry of the matrix M is set to 1, if the respective transmission link of the row of the entry is part of the path through the network for the respective stream of the respective column, and wherein the entry is set to zero otherwise. For the exemplary telecommunication network of FIG. 9, the matrix M may be the following:

| Link Begin | Link End | Stream 1 | Stream 2 | Stream 3 | Stream 4 | Stream 5 | Stream 6 | Stream 7 | Stream 8 | Stream 9 | Stream 10 | Stream 11 | Stream 12 |
|---|---|---|---|---|---|---|---|---|---|---|---|---|---|
| 901 | 904 | 1 | 1 | 1 | 1 | 1 | 1 | 0 | 0 | 0 | 0 | 0 | 0 |
| 903 | 902 | 1 | 0 | 0 | 1 | 0 | 0 | 0 | 0 | 0 | 0 | 0 | 0 |
| 904 | 903 | 1 | 0 | 0 | 1 | 0 | 0 | 0 | 0 | 0 | 0 | 0 | 0 |
| 904 | 905 | 0 | 1 | 0 | 0 | 1 | 0 | 0 | 0 | 0 | 0 | 0 | 0 |
| 904 | 910 | 0 | 0 | 1 | 0 | 0 | 1 | 0 | 0 | 0 | 0 | 0 | 0 |
| 905 | 906 | 0 | 1 | 0 | 0 | 1 | 0 | 0 | 0 | 0 | 0 | 0 | 0 |
| 906 | 907 | 0 | 1 | 0 | 0 | 1 | 0 | 0 | 0 | 0 | 0 | 0 | 0 |
| 907 | 908 | 0 | 1 | 0 | 0 | 1 | 0 | 0 | 0 | 0 | 0 | 0 | 0 |
| 910 | 915 | 0 | 0 | 1 | 0 | 0 | 1 | 0 | 0 | 0 | 0 | 0 | 0 |
| 915 | 917 | 0 | 0 | 0 | 0 | 0 | 0 | 1 | 0 | 0 | 1 | 0 | 0 |
| 915 | 918 | 0 | 0 | 1 | 0 | 0 | 1 | 0 | 0 | 0 | 0 | 0 | 0 |
| 916 | 919 | 0 | 0 | 0 | 0 | 0 | 0 | 1 | 0 | 1 | 1 | 0 | 1 |
| 917 | 922 | 0 | 0 | 0 | 0 | 0 | 0 | 1 | 0 | 0 | 1 | 0 | 0 |
| 918 | 915 | 0 | 0 | 0 | 0 | 0 | 0 | 1 | 0 | 0 | 1 | 0 | 0 |
| 918 | 925 | 0 | 0 | 1 | 0 | 0 | 1 | 0 | 0 | 1 | 0 | 0 | 1 |
| 919 | 918 | 0 | 0 | 0 | 0 | 0 | 0 | 1 | 0 | 1 | 1 | 0 | 1 |
| 920 | 916 | 0 | 0 | 0 | 0 | 0 | 0 | 1 | 0 | 1 | 1 | 0 | 1 |
| 920 | 924 | 0 | 0 | 0 | 0 | 0 | 0 | 0 | 1 | 0 | 0 | 1 | 0 |
| 921 | 920 | 0 | 0 | 0 | 0 | 0 | 0 | 1 | 1 | 1 | 1 | 1 | 1 |
| 924 | 926 | 0 | 0 | 0 | 0 | 0 | 0 | 0 | 1 | 0 | 0 | 1 | 0 |
| 925 | 927 | 0 | 0 | 1 | 0 | 0 | 1 | 0 | 0 | 1 | 0 | 0 | 1 |
| 926 | 923 | 0 | 0 | 0 | 0 | 0 | 0 | 0 | 1 | 0 | 0 | 1 | 0 |
| 927 | 928 | 0 | 0 | 1 | 0 | 0 | 1 | 0 | 0 | 1 | 0 | 0 | 1 |

| Link Begin | Link End | Stream 1 | Stream 2 | Stream 3 | Stream 4 | Stream 5 | Stream 6 | Stream 7 | Stream 8 | Stream 9 | Stream 10 | Stream 11 | Stream 12 |
|---|---|---|---|---|---|---|---|---|---|---|---|---|---|
| 928 | 929 | 0 | 0 | 1 | 0 | 0 | 1 | 0 | 0 | 1 | 0 | 0 | 1 |
| 929 | 930 | 0 | 0 | 1 | 0 | 0 | 1 | 0 | 0 | 1 | 0 | 0 | 1 |

From the matrix M one can see that the links (901 to 904) and (921 to 922) are associated with controllers 901, 921 and that each of them is used by six streams. The first intersection between streams from different controllers takes place in the link (918 to 925). Hence, these three transmission links are transmission links, where different data streams merge. Therefore, the plurality of shared transmission links is determined by comparing the paths based on the matrix M.

Moreover, based on the matrix M the shared transmission links, at which at least two data streams of the plurality of data streams merge, are determined.

Moreover, the rows associated with one of the links 901 to 904, 921 to 922 and 918 to 925 are extracted from the matrix M and a new matrix Mrelevant is determined, which has the dimension (Number_of_Relevent_Links×Number_of_Streams), i.e. (3×12) in the exemplary case:

| | | | | | | | | | | | |
|---|---|---|---|---|---|---|---|---|---|---|---|
| 1 | 1 | 1 | 1 | 1 | 1 | 0 | 0 | 0 | 0 | 0 | 0 |
| 0 | 0 | 0 | 0 | 0 | 0 | 1 | 1 | 1 | 1 | 1 | 1 |
| 0 | 0 | 1 | 0 | 0 | 1 | 0 | 0 | 1 | 0 | 0 | 1 |

For modifications, in which the telecommunication network does not have a tree-type topology, also further shared link nodes—e.g. link nodes beside the link nodes where data streams merge for the first time—may be relevant for determining the at least one where you being indicative of the interference, as data streams may merge multiple times, e.g. after a loop. Hence, for a telecommunication network with a tree-type topology, at least in some implementations, it is sufficient to extract the rows of the matrix M which reflect only the links where streams meet and overlap for the first time (assuming that the streams will not part and then overlap again later on their ways, e.g. due to loops).

An (initial) phase-allocation for the data streams is performed by defining variables Ph(i) for each of the data streams, e.g. in the exemplary case for i=1 to 12. The variable Ph(j) associated with the stream "j" can take integer values between [1: RR(j)], where RR(j) is the repetition rate of the data stream "j". Hence, for the streams with the RR=2, the associated Ph variable can take values [1, 2] and for those with RR=4, the valid values of Ph are [1, 2, 3, 4]. The value assigned to a Ph-variables indicates the phase, i.e. the transmission cycle where the first sending of the repetitive transmissions takes place.

In the exemplary case, the maximum RR over all streams is 4, hence it is enough to determine the at least one value indicative of the interference and its dependence on the phase allocation for 4 (consecutive) transmission cycles (e.g. a first network cycle, a second network cycle, a third network cycle, and a fourth network cycle).

For the initial phase allocation each of the phases may be set to one, e.g. the exemplary case Ph(i)=1 for i=1 to 12. Based on the initial phase allocation and the repetition rates a phase assignment matrix is determined. In the exemplary case, the phase assignment matrix may have the following values:

| | | | |
|---|---|---|---|
| 1 | 0 | 1 | 0 |
| 1 | 0 | 1 | 0 |
| 1 | 0 | 1 | 0 |
| 1 | 0 | 0 | 0 |
| 1 | 0 | 0 | 0 |
| 1 | 0 | 0 | 0 |
| 1 | 0 | 1 | 0 |
| 1 | 0 | 1 | 0 |
| 1 | 0 | 1 | 0 |
| 1 | 0 | 0 | 0 |
| 1 | 0 | 0 | 0 |
| 1 | 0 | 0 | 0 |

The columns of the phase assignment matrix are associated with the network cycles and the rows of the phase assignment matrix or are associated with the data streams. Hence, in the first network cycle all data streams are sent, e.g. each of the repetitive transmissions of the data streams is transmitted—as can be seen from the first column of the phase assignment matrix. In the second network cycle and in the fourth network cycle no data streams are sent. As can be seen from the third column of the phase assignment matrix, in the third network cycle the data streams Stream 1, Stream 2 and Stream 3 as well as the data streams Stream 6, Stream 7 and Stream 8 are sent.

By multiplying the matrix Mrelevant with the phase allocation matrix, and taking into account that a maximum delay in the case of interference of streams from two different controllers is equal to the minimum number of involved streams over controllers, a further matrix is determined which shows the number of overlaps in its entries, wherein the further matrix has a number of columns equal to the number of observed network cycles and a number of roles equal to the number of relevant transmission links, i.e. in the exemplary case:

| | | | |
|---|---|---|---|
| 6 | 0 | 3 | 0 |
| 6 | 0 | 3 | 0 |
| min(2, 2) | 0 | min(1, 1) | 0 |

In a more general scenario, where e.g. data streams overlap—i.e. in particular merge and possibly interfere—at a shared link node, the minimum number of involved streams coming from a previous transmission link may be used for the respective entry in further matrix, in order to take into account that data streams which have been merged previously—e.g. at the previous transmission link—do not further delay each other. Alternatively, the sum over respective numbers of involved data streams coming from respective previous shared transmission links may be used for the respective entry in the further matrix, wherein the minimum number of involved streams coming from one of the previous transmission links or, alternatively, the maximum number of involved streams coming from one of the previous transmission links is subtracted from the sum.

By assigning over the rows, a total interference for each of the network cycles may be determined, i.e. in the exemplary case:

| 14 | 0 | 7 | 0 |
|----|---|---|---|

As can be seen, for the initial phase alignment the interference there is a load over the network cycles.

By optimizing the phase allocation the interference at the shared transmission links and/or the total interference may be reduced. By performing the numerical optimization or the combinatorial optimization as outlined above, the following phases are determined for the data streams: Ph(1)=2, Ph(2)=1, Ph(3)=1, Ph(4)=3, Ph(5)=2, Ph(6)=3, Ph(7)=2, Ph(8)=1, Ph(9)=2, Ph(10)=4, Ph(11)=2, Ph(12)=4.

Hence, after optimization the phase assignment matrix has the following values:

| 0 | 1 | 0 | 1 |
|---|---|---|---|
| 1 | 0 | 1 | 0 |
| 1 | 0 | 1 | 0 |
| 0 | 0 | 1 | 0 |
| 0 | 1 | 0 | 0 |
| 0 | 0 | 1 | 0 |
| 0 | 1 | 0 | 1 |
| 1 | 0 | 1 | 0 |
| 0 | 1 | 0 | 1 |
| 0 | 0 | 0 | 1 |
| 0 | 1 | 0 | 0 |
| 0 | 0 | 0 | 1 |

Moreover, the further matrix of the following values:

| 2 | 2 | 4 | 1 |
|---|---|---|---|
| 1 | 3 | 1 | 4 |
| 0 | 0 | 0 | 0 |

As can be seen, no (further) interference occurs at the (relevant) shared link node 918 to 925, because, after optimizing, due to the optimized phase allocation, repetitive transmissions from the originator node 901 and repetitive transmissions from the originator node 921 are never sent to the destination node 930 within the same network cycle. Hence, in order to find the actual worst case interference, the entries in the third row are set to zero. Thus, the maximum over all shared links and over all network cycles, i.e. the worst-case interference, is 4.

Notably, also when determining the values for the third row by summing up over the involved data streams and subtracting the maximum or the minimum number of data streams coming from a previous shared transmission link, would result in all values being zero, because in network cycle 1 only Stream 3 is transmitted to destination node 930—hence no interference occurs-, in network cycle 2 only Stream 9 is transmitted to destination node 930—hence no interference occurs —, in network cycle 3 Stream 3 and Stream 6 is transmitted to destination node 930—so the interference already occurs at originator node 901 or at least at transmission link 901 to 904 and this count of interference, i.e. a count of 1 is subtracted from the sum over all involved streams/counts of all involved streams, i.e. 1−1=0−, likewise in network cycle 4 Stream 9 and Stream 12 is transmitted to destination node 930—so interference between them occurs at a previous node or link, i.e. at the originator node 921 or at least at the transmission link 921 to 920.

Finally, the total interference is determined as

| 3 | 5 | 5 | 5 |
|---|---|---|---| and it can be seen, that the occurring interferences are now distributed more evenly over the network cycles.

As can be seen in FIG. 6, wherein the transmission cycles are arranged along a time axis 550, the repetitive transmissions of the plurality of data streams are, in some further modifications, shifted relative to each other within each of the transmission cycles 531, 532, 533, 534 with regard to a starting time, the starting time 551, 552, 553, 554 being indicative of the start of data transmissions within the respective transmission cycle. In some further modifications, the network scheduling apparatus 300 and/or the gateway node 800 comprises a time aware shaper, adapted to shift the repetitive transmissions within at least one of the transmission cycles.

Thereby, interference between the repetitive transmissions may be further mitigated, whereby, e.g., the worst-case arrival time may be (further) reduced. In some further implementations, the nodes of the telecommunications network or at least the link nodes or at least the shared link nodes may each comprise a time aware shaper. By scheduling the repetitive transmissions based on the phase allocation determined by the at least one optimization/the numerical optimization in combination with such a time aware shaper, the reliability of the transmissions of the repetitive transmissions of the data streams may be (further) enhanced—e.g. due to the deterministic scheduling based on the phase allocation guaranteeing fulfillment of certain upper limits even when shifting the repetitive transmissions within one the transmission cycles —, while synergistically increasing a throughput through the telecommunication network, or synergistically (further) reducing the worst-case arrival time or the aggregate total traveling time or the worst-case delay.

In some embodiments, e.g. for further mitigating interferences and/or reducing worst-case arrival times, e.g. below a threshold such as a scheduling constraint, a transmission order is determined, wherein repetitive transmissions from at least one originator node of the telecommunication network and for at least one phase are transmitted by the at least one originator node within a transmission cycle associated with the at least one phase according to the transmission order.

In some embodiments, at a further method step of method 400 or 700, a respective transmission order for the transmitting of the repetitive transmissions at each originator node and within each phase is determined.

In some embodiments, a final transmission order is determined after assigning phases to each data stream of the plurality of data streams and is used as the transmission order for the scheduling. In some further implementations, a previously determined transmission order is used as a preliminary transmission order for distributing the repetitive transmissions over the phases. In some further implementations, after phase-allocation, the (final) transmission order is determined at least based on the distributing of the repetitive transmissions over the phases—e.g. the phase-allocation. Moreover, in some further modification, the determining of the final transmission order may be independent from the preliminary transmission order, .e.g. the preliminary transmission order is not taken as an input for the determining of the final transmission order, yet, some (indirect) dependence may arise, e.g. due to taking into account the preliminary transmission order during phase-allocation.

In some embodiments, in which the (final) transmission order is determined after assigning phases to each data stream of the plurality of data streams, the transmission order for at least one originator node and for at least one phase is determined by sorting, based on a comparison function taking into account a worst-case arrival time of each of the repetitive transmissions scheduled for transmission by the at least one originator node within the at least one phase. Likewise, a respective transmission order may be determined for each originator node of the telecommunication network 100.

For example, an arrival time of a (repetitive) transmission—i.e. a time relative to a beginning of a phase within which the transmission is transmitted, wherein a last bit of the transmission arrives at a respective destination node—may depend on the following:
1) Its starting time (offset with respect to the beginning of the network cycle);
2) Its length (the length/amount of data of the repetitive transmission);
3) Its path consisting of links (e.g. cables) and further network nodes (e.g. Bridges);
4) The transmission speed/bandwidth (which may vary through the network);
5) The corresponding Cable-Delays and Bridge-Delays (BDs);
6) The corresponding Forwarding mechanism in Bridges (Store & Forward (S&F), Cut-Through, . . . );
7) The corresponding Traffic-Shapers in Bridges
8) Its phase-allocation in case that its repetition rate is greater than one (RR>1);
9) Its interference with other Hi-priority streams/streams of the plurality of data streams, which e.g. share the same output port of a bridge but have arrived at different ports (or originate in that bridge, while our transmission of interest does not) and/or which e.g. share network link, i.e. wherein the paths of them have a shared network link, e.g. due to having the same output port at a bridge;
10) Its interference with streams of different priority, such as the Low-priority frames, e.g. if not (sufficiently) preempted.

For example, in order to estimate arrival times of frames, one has to deal with uncertainty of different delay variables such as the Bridge Delays, interference delays, etc. Hence, one may calculate worst-case influences of these variables and have a conservative estimate of delays that a (repetitive) transmission experiences along its path from its originator node to its destination node.

For such an (worst-case) estimation, e.g., the following assumptions may be made:
1) All bridges/further network nodes will use the delayed Cut-Through forwarding mechanism; This is beneficial, while other mechanisms such as S&F are two "slow" and they also affect the following (repetitive) transmissions, thereby, e.g., increasing a computational effort for determining (worst-case) arrival times;
2) Traffic shapers, if any, will advantageously be the Strict-Priority ones; Possible implementation of other shapers may increase the computational effort in the worst-case delay models, because they make these models more complex and expensive for optimization;
3) The lower priority transmissions, e.g. lower priority frames, can be preempted;
4) A possible interference with other streams/a worst-case delay caused by interference is proportional to the sum of amount of data of the repetitive transmissions of all other interfering streams, e.g. is proportional to the sum of the frame-lengths of all other interfering streams. This is a result of the fact that one does not have guaranteed minimum traveling durations but only upper bounds;
5) Streams at an originator node—also called a "talker"—are sent ordered by RR, i.e. all streams of RR=2 must be sent before any stream of RR=4 et cetera. When all RRs are powers of 2, this guarantees that a stream can be sent at the same time in each transmission cycle associated with one of the phases assigned to the respective data stream.

For example, under these assumptions, the arrival time of a (repetitive) transmission is equal to the sum of a transmission starting time—also called "sending time"—(e.g. an offset from the beginning of the respective phase, e.g. determined by the transmission order), the travelling duration of the transmission along its path without interference, and the possible worst-case interference with other streams which originate at different talkers/originator nodes (interference with streams that share an originator node is encoded in the transmission starting time of the transmission, e.g. by the transmission order for the respective originator node).

Hence a worst-case arrival time of a (repetitive) transmission may be calculated as: Transmission-Arrival-Time=Transmission-Start-Time+Transmission-Travel-Duration+Worst-Case-Delay-Caused-By-Interference.

In some embodiments, at the further method step, the (final) transmission order is determined such that the maximum of (worst-case) arrival times over all streams is minimized. Based on the unexpected insight, that the worst-case delay due to interference from streams from other originator nodes is dependent on the phase assignment for the other originator nodes but is independent from the transmission order for the other originator nodes, the maximum arrival time over all streams is minimized by separately/independently minimizing a respective maximum/worst-case arrival time for each one of the group of originator nodes. Hence, it can e.g. be shown for some implementations that, by independently sorting the respective streams from each respective one of the group of originator nodes and for each respective one of the plurality of phases, a maximum value of the worst-case arrival times over all streams for the respective originator node and phase has the lowest possible value, and—due to the worst-case delay caused by interference from streams from other originator nodes being independent from the transmission order for the other originator nodes—also a maximum value of the worst-case arrival times over all streams from all originator nodes and for all phases has its lowest possible value.

An implementation and proof are given in the following:

Note that worst-case interference between streams, which are sent at different talkers is only determined by phase allocation. Moreover, phase allocation also determines whether traffic and queue size restrictions at nodes are met.

Consequently, we can assume that each stream s has a fixed value v(s), representing the delays which cannot be influenced like the travelling time—e.g. traveling duration—in the network and interference resulting from previous choices (path and phase allocation).

$$v(s) = d_{const}(s) + \text{fixedInterTalkerInterference}(s) \qquad \text{Equation: Definition } v(s)$$

Now, a brief look at the definition of the worst-case arrival time of a stream shows that stream scheduling can only influence the sending time of the frames at one talker. Therefore, frame scheduling—e.g. scheduling of transmissions for the plurality of data streams—at each talker is an independent problem and it suffices to consider the problem at one talker. Now, we want to schedule the frames such that the maximum worst-case (last bit) arrival time over all streams is minimized while respecting the constraints that streams with smaller reduction rates are sent first. Formally, the frame scheduling problem/stream scheduling problem can be formulated as follows.

Stream Scheduling Problem (SSP)

Input: A set S(t) of streams which are sent from one talker, a value function $v:S(t) \to \mathbb{R}$, phase assignments $p:S(t) \to \mathbb{N}$, s.t. $p(s) \in [RR(s)-1]$ Output: A partial order < on S(t) such that
  i. s<s' or s'<s↔p(s)=p(s')mod min(RR(s),RR(s')), i.e. two streams s and s' are comparable if and only one stream delays the sending time of the other.
  ii. If RR(s)<RR(s'), then s<s' i.e. streams with smaller RRs are scheduled first
  iii. $\max_{s \in s(t)} \Sigma_{s' \in S(t):s' \leq s} f(s') + v(s)$ is minimized, wherein e.g. f(s') is the transmission duration of s' and possible a offset, e.g. for providing a gap between consecutive transmissions.

First, note that for v(s) as defined in the Equation above, (iii.) corresponds exactly to the maximum arrival time if streams are sent in the order defined by the partial order output, as $\Sigma_{s' < s} f(s')$ is the sending time of s—e.g. the transmission starting time of the repetitive transmission of the data stream s. Therefore, a solution to SSP provides an optimal scheme for scheduling frames/scheduling repetitive transmissions.

We now show that, in contrast to practically all variants of the phase allocation problem, we can find an optimal stream schedule for a given fixed phase allocation—e.g. a previously determined phase assignment—very efficiently, since we can solve SSP by sorting.

Theorem: The STREAM SCHEDULING PROBLEM can be solved optimally in time O(n log(n)).

Proof: We show that SSP can be solved by repeatedly solving a standard scheduling problem. Consider (1|(d$_j$)|L$_{max}$). This describes in standard scheduling notation as introduced in [Graham, R. L.; Lawler, E. L.; Lenstra, J. K.; Rinnooy Kan, A. H. G. (1979) "*Optimization and Approximation in Deterministic Sequencing and Scheduling: a Survey*" (PDF). *Proceedings of the Advanced Research Institute on Discrete Optimization and Systems Applications of the Systems Science Panel of NATO and of the Discrete Optimization Symposium*. Elsevier. pp. (5) 287-326] a single machine scheduling problem where the goal is minimizing the maximum lateness of a job.

In scheduling theory, we are given a set of machines, which can process one job at a time and jobs with durations, as well as different attributes and side constraints. The goal is to schedule all jobs on the machines such that all constraints are met, and some objective function is optimized. In this case, we have only one machine. The lateness l(j) of a job j is defined as the difference between j's completion time and its due date d$_j$. The maximum lateness L$_{max}$ is then the maximum lateness over all jobs. Since the objective function requires the presence of due dates, they are often omitted in the notation, i.e. (1||L$_{max}$) is also a possible description.

This problem can be solved efficiently by applying the Earliest Due Date Rule (EDD) as a special case of Lawler's algorithm [Lawler (1973): Optimal Sequencing of a single machine subject to precedence constraints. Management Science 19, 544-546]. The correctness of Lawler's algorithm implies that scheduling the jobs according to their due date minimizes the maximum lateness.

Now, we explain how to formulate the SSP this way, hence, e.g. how to apply EDD for a technical solution for scheduling the transmissions of the plurality of data streams. We iterate over the RRs in increasing order and for each RR over the phases and consider all streams in $S^R(t)$ with a fixed phase p, let's call this set $S^R(t,p)$. Each stream $s \in S^R(t,p)$ corresponds to a job j(s) with duration f(s). All jobs are available for scheduling at time 0. Then, we set the due date $$d(j(s)) = -v(s) - \sum_{R \in [RR(s)/2]_2} \sum_{s' \in S^R(t): p(s') = (p \bmod RR(s'))} f(s)$$

Mathematical Claim: With d(s) defined as above, the lateness of a stream is its (last bit) arrival time if streams are sent in the order indicated by the schedule.

Let the jobs $j_0, \ldots, j_n$ be ordered according to an optimal schedule and $s_0, \ldots, s_n$ be the corresponding streams. The completion time of a job in our current scheduling problem is the sum of all previously scheduled job durations and the duration of the job itself. The lateness of a job $j_i$ is therefore $$\sum_{k \leq i} f(s_k) - d(s_i) =$$

$$\underbrace{\sum_{R \in [RR(s)/2]_2} \sum_{s' \in S^R(t): p(s') = (p \bmod RR(s'))} f(s) + \sum_{k < i} f(s_k)}_{\text{sending time of } s_i} + f(s_i) + v(s_i).$$

By definition, this is the arrival time of $s_i$.

The Mathematical Claim directly implies that the maximum arrival time is minimized for each RR. The influence of streams with different RRs on the sending time is only determined by phase allocation, not by the ordering. Therefore, minimizing the maximum arrival time within each RR and phase is enough to minimize it globally.

In fact, it would be enough to minimize the arrival time for RRs which have at least one "last stream", i.e. a stream which does not delay the sending of any other stream, in order to minimize the maximum arrival time at a talker. However, we are also interested in solutions which are as resource efficient as possible. Since scheduling every RR makes the final result more efficient in terms of network resources and sorting once does not use much computational resources, the additional effort seems worth it.

To apply EDD for all RRs and phases, it is enough to sort S(t) once: by RR, within each RR by phase and within each phase by due date. The required partial order is implicit, and we can compute the sending times using this order. Since sorting takes $O$ (n log n) this concludes the proof.

Q.E.D.

Thereby, beneficially the running time bound refers to the problem as stated above, not to the generation of input data. Hence, once the input data is available (which is usually the case after phase allocation/phase allocation), we just showed that the minimizing of the traveling duration may be performed by a sorting algorithm, which is very efficient regarding the actual running time on a machine such the network scheduling apparatus.

From the above the following conclusions can be drawn.

In some embodiments, the numerical optimization is implemented using a mixed integer linear program. This may beneficially allow to guarantee that a result of the numerical optimization—i.e. the determined phases—have optimal values. Moreover, this may beneficially facilitate determining the phases in a computationally efficient way and/or facilitate reducing an amount of energy required for determining the phases, whereby, e.g. in an industrial environment, cooling requirements may be reduced. For example, when the method is performed for scheduling repetitive transmissions of a manufacturing process and the manufacturing process causes particles in the air such as dust, it may be beneficial to cool and apparatus performing the method and a passive way or at least to restrict airflow through the apparatus.

In some embodiments, the numerical optimization is performed by a network scheduling apparatus, a gateway node or a network controller of the telecommunication network. An advantage of performing the method by a network scheduling apparatus, a gateway node or a network controller may particularly be, that these may be integrated with the telecommunication network, whereby, e.g., the reliability of scheduling may be increased. Moreover, by performing the method with a gateway node, the gateway node may beneficially schedule data transmissions, e.g. the repetitive transmissions, by receiving them on one or more communication interfaces such as network ports and routing them through the gateway node to one of the communication interfaces and in accordance with the scheduling.

Moreover, combining performing the method by a network scheduling apparatus, gateway node or network controller with implementing the numerical optimization using a mixed integer linear program or mixed integer linear solver, may synergistically facilitate scheduling the transmissions and/or synergistically allowed to reduce the requirements—with regard to computational power and/or cooling—for the network scheduling apparatus/gateway node/network controller. Moreover, by the mixed integer linear programming/solver scheduling a higher number of transmissions may be facilitated compared to other optimization techniques. Furthermore, also with limited computing power, the mixed integer linear programming/solver may facilitate fulfilling certain time constraints and/or facilitate real-time scheduling and/or real-time changing of the scheduling—e.g. for other repetition rates and/or other originator nodes or destination nodes —.

In some embodiments, for at least one phase, at least one group of respective repetitive transmissions of respective data streams of the plurality of data streams is from at least one originator node, wherein the at least one originator node is adapted to transmit the repetitive transmissions of the at least one group within transmission cycles associated with the at least one phase according to their respective phases and respective repetition rates, wherein an order of transmission within each of these transmission cycles is determined by a transmission order of the at least one group. Moreover, the method further comprises determining, after determining respective phases for each of the plurality of data streams, the transmission order of the at least one group by sorting each repetitive transmissions of the at least one group based on a comparison function taking into account a respective worst-case arrival time of the respective repetitive transmissions.

In some embodiments, after assigning phases to each data stream of the plurality of data streams, a transmission order of at least one group of repetitive transmissions for at least one originator node and for at least one phase is determined based on the phase assignments for each data stream of the plurality of data streams.

In some embodiments, the respective repetitive transmission of each of the data streams are scheduled—e.g. by a scheduling signal send to at least one or to all of the originator nodes —, wherein the respective repetitive transmission starts at the respective phase assigned to the respective data stream and is repetitively transmitted after a number of phases equal to the respective repetition rate.

In some embodiments, in which the respective repetitive transmission of each of the data streams are scheduled to start at the respective phase assigned to the respective data stream and to be repetitively transmitted after the number of phases equal to the respective repetition rate, within each of the phases the repetitive transmissions from the same originator node are transmitted according to a transmission order.

In some embodiments, in which the repetitive transmissions from the same originator node are transmitted according to a transmission order, the method comprises determining—e.g. after assigning phases to each data stream of the plurality of data streams and/or prior to scheduling the respective repetitive transmission of each of the data streams—the transmission order for at least one originator node and for at least one phase based on the assigning of the phases to each data stream of the plurality of data streams.

In some embodiments, in which the repetitive transmissions from the same originator node are transmitted according to a transmission order, the method comprises determining—e.g. after assigning phases to each data stream of the plurality of data streams and/or prior to scheduling the respective repetitive transmission of each of the data streams—the transmission order for at least one originator node and for at least one phase by sorting—e.g. by means of a sorting algorithm —, based on a comparison function taking into account a worst-case arrival time of the repetitive transmissions scheduled for transmission by the at least one originator node within the at least one phase, e.g. for transmission by the at least one originator node within each transmission cycle associated the at least one phase.

In some embodiments, in which for determining a transmission order of repetitive transmissions for at least one originator node of the group of originator nodes and for at least one phase of the plurality of phases a worst-case arrival time of the repetitive transmissions is taken into account, the worst-case arrival time of a current one of the repetitive transmissions is determined based on the assigning of the phases to each data stream of the plurality of data streams and based on the transmission order of further ones of the repetitive transmissions being scheduled for transmission prior to the current one, but is e.g. independent of possibly further transmission orders for other originator nodes and/or for other phases.

In some embodiments, in which a transmission order of at least one group of repetitive transmissions for at least one originator node and for at least one phase is determined, each respective repetitive transmissions of the at least one group are from a respective data stream from the at least one originator node, wherein the at least one phase has been assigned to the respective data stream or another phase has been assigned to the respective data stream such that a number of the another phase and an integer multiple of the respective repetition rate of the respective repetitive transmission is equal to a number of the at least one phase.

In some embodiments, in which a transmission order—e.g. of at least one group of repetitive transmissions—is determined for at least one originator node and for at least one phase, the determining of the transmission order takes into account an order criterion such as a worst-case arrival time of repetitive transmissions scheduled for being transmitted by the at least one originator node within the at least one phase according to their phase assignments and repetition rates—e.g. the at least one group of repetitive transmissions consisting of the repetitive transmissions scheduled for being transmitted.

In some embodiments, in which a transmission order of at least one group of repetitive transmissions for at least one originator node and for at least one phase is determined, the determining of the transmission order comprises—e.g. is performed by—sorting the at least one group of repetitive transmissions taking into account a respective order criterion such as a respective worst-case arrival time of each repetitive transmission of the at least one group.

In some embodiments, the (respective) order criterion is a criterion related to a worst-case estimation such as a worst-case arrival time. This may allow to determine a transmission order for an originator node and for a phase—e.g. taking into account such an order criterion—based on the phase assignment but independent from other phases and/or independent from possible transmission orders for other originator nodes.

Within the meaning of the present application a "worst-case" may at least refer to an estimation for a scenario, wherein from one or more possibilities, e.g. realizations of the scenario, the worst one is chosen. By such an estimation it may advantageously be guaranteed that if a condition or constraint is met in the worst-case, it will also be met in all other possible realizations of the scenario. For example, for a worst-case delay caused by interference every possible interference of a respective transmission with any other transmission that may eventually interfere, e.g. which is transmitted within the same phase and which shares at least one link or node with the respective node, is taken into account, e.g. added up.

Likewise, a worst-case arrival time of a (repetitive) transmission, e.g. a Transmission-Arrival-Time, may be calculated as the sum of the Transmission-Start-Time and the Transmission-Travel-Duration and the Worst-Case-Delay-Caused-By-Interference, wherein typically the Transmission-Start-Time is (pre-) determined—e.g. by a transmission order—and the Transmission-Travel-Duration is fixed due to a (pre-) determined path through the telecommunication network and thus have only one possibility and/or always represent/realize the best as well as the worst case. In case of transmissions that may be transmitted along at least two paths, also for the Transmission-Travel-Duration a worst case Transmission-Travel-Duration may be used, i.e. the path of the at least two paths that results in the longer travel duration also this path.

Consequently, the worst-case arrival time of a (repetitive) transmission of a data stream may also be referred to as "maximum arrival time" as the worst-case arrival time is the maximum of all possible arrival times of the (repetitive) transmission, e.g. for a given phase, taking into account any possible interference, whereas in other realizations resulting in another one of the possible arrival times some of the interferences with other transmissions might not occur. Moreover, a "maximum arrival time" may also refer to a maximum arrival time over all (data) streams, e.g. from one or some or all of the group of originator nodes, wherein this maximum arrival time over all of these streams is a maximum value of each of the maximum/worst-case arrival times of each of the (repetitive) transmissions of these data streams and possibly over all phases of the plurality of phases or, respectively, with respect to one phase of the plurality of phases.

In some embodiments, in which a transmission order of at least one group of repetitive transmissions is determined by sorting—e.g. comprising, consisting of, or being performed by sorting and e.g. by means of a sorting algorithm —, the sorting is based on a comparison function taking into account a respective order criterion such as a respective worst-case arrival time of each repetitive transmission of the at least one group.

In some embodiments, the method further comprises receiving at least one configuration signal being indicative of the repetition rates of the repetitive transmissions of the plurality of data streams.

In some embodiments, the at least one value is based on a respective total traveling time of the respective repetitive transmissions of each of the plurality of data streams.

In some embodiments, in which the at least one value is based on a respective total traveling time, the objective function of the numerical optimization further comprises an aggregate total travelling time, wherein the aggregate total travelling time is an aggregation of each of the values of the total traveling times. In some implementations, the aggregate total traveling time is determined by summing over each of the values of the total traveling times, e.g. by summing over each respective total traveling time for each of the data streams. This may beneficially allow to (also) optimize the aggregate total traveling time, which may be an indicator of load on the telecommunication network caused by the data streams.

In some embodiments, in which the at least one value is based on a respective total traveling time, the numerical optimization takes into account one or more upper limits selected from a group comprising: a worst-case traveling time, a worst-case arrival time, a worst-case delay and a worst-case aggregate total travelling time. This may beneficially allowed to ensure that certain requirements are fulfilled. For example, when controlling a manufacturing process based on the scheduling provided by the method, that may be required that each of the repetitive transmissions features its destination node within one transmission cycle, e.g. to ensure proper feedback loops of the manufacturing process.

In some embodiments, the respective total travelling time depends on one or more transmission delays encountered along the respective path and depends on the interference between the respective repetitive transmissions and other repetitive transmissions of the plurality of data streams. In some implementations, the one or more transmission delays comprise delays encountered at cables of the network, bridges of the network, switches of the network and/or further delays caused by a transmission medium. In some implementations, the respective total traveling time—for each of the data streams—is determined by summing over all one or more transmission delays encountered along the respective path and furthermore summing over the interference between the respective repetitive transmissions and other repetitive transmissions of the plurality of data streams.

In some embodiments, when summing over this interference, for each interference occurring between the respective repetitive transmissions and other repetitive transmissions, a data size of the respective repetitive transmissions and a data size of the other respective repetitive transmissions is determined, wherein for each shared link node all data sizes are added up. In some further modifications, when adding up all data sizes, only such data sizes are taken at account that are is associated with data streams merging at the respective shared link node.

In some embodiments, the data sizes of a previous transmission link, for which some of the merging data streams are transmitted, wherein a sum over these data sizes has a maximum value or a minimum value compared to data sizes coming from other previous transmission links, are not taken into account.

This may beneficially allow to take into account interference between data streams only when they merge, as, e.g., after merging these data streams do not further interfere with each other but will, e.g., be arranged such that one of the repetitive transmissions of the status streams is transmitted before the repetitive transmissions of the other one, whereby (further) interferences mitigated.

In some embodiments, in which the numerical optimization takes into account one or more upper limits, the worst-case arrival time is determined by the maximum of each of the respective total travelling times including an interference at a respective originator node.

In some embodiments, in which the numerical optimization takes into account one or more upper limits, the worst-case delay is determined by the maximum of each of the respective total travelling times excluding an interference at a respective transmission node.

In some embodiments, in which the numerical optimization takes into account one or more upper limits, the method further comprises selectively providing a warning signal if the numerical optimization fails to meet at least one of the one or more upper limits.

In some embodiments, the numerical optimization comprises determining the at least one value indicative of the interference for a predetermined number of transmission cycles and minimizing an aggregation of the values indicative of the interference across the predetermined number of transmission cycles. In some implementations, worst-case values such as values for a worst-case arrival time, a worst-case delay or a worst-case traveling time or a worst-case total traveling time is determined by selecting a maximum value of the respective values for each transmission cycle. Hence, in some implementations, the worst-case arrival time is determined by selecting the arrival time from the network cycle which has the highest value.

In some embodiments, the at least one value is based on a weighted average of a worst-case arrival time and an aggregate total travelling time, wherein the aggregate total travelling time is an aggregation of each of the values of the total traveling times. Thereby both, the worst-case arrival time—being e.g. relevant for the reliability of the network—and the aggregate total traveling time—being e.g. relevant for the performance of the network and/or efficient utilization of bandwidth of the telecommunication network—may beneficially be optimized.

An advantage of the weighted average may particularly be that, while the aggregate total travelling time typically has a higher value than the worst-case arrival time (e.g. when more than one data stream is involved), this may be balanced by the weighted average. Accordingly, in some implementations the worst-case arrival time may have a weight—when calculating the weighted average—that is larger than a weight of the aggregate total travelling time by a factor of a count of the plurality of data streams—e.g. the number of data streams for which the optimization is performed/which are scheduled. In some further implementations, the factor may be larger than the count, which may beneficially allow to give the worst-case arrival time a higher weight, whereby reliability of the network, e.g. reliability of transmitting and arrival, at a respective destination node, of the repetitive transmissions may be improved. In some implementations, one or more further values—such as a value for the worst-case delay—may be used when calculating the weighted average.

In some embodiments, in which the at least one value is based on a weighted average, the numerical optimization takes into account the worst-case traveling time as at least one upper limit of one or more upper limits. This may beneficially allow to simultaneously optimize several values—e.g. the ones used, when determining, e.g. calculating, the weighted average, such as the worst-case arrival time, the aggregate total travelling time and/or the worst-case delay —, while ensuring that the worst-case traveling time stays below or at the upper limit, whereby, e.g., deterministic scheduling may be facilitated and the reliability of the telecommunication network may be enhanced.

In some embodiments, the respective repetition rate of the respective repetitive transmissions of each of the plurality of data streams is an integer power of two. Furthermore, in some implementations, in which the at least one value indicative of the interference is determined for a predetermined number of transmission cycles, this predetermined number is a maximum of the repetition rates. An advantage of repetition rates being integer powers of two may particularly be, that overall transmissions of the repetitive transmissions are cyclic after a number of cycles being the least common multiple of the repetition rates, wherein this least common multiple is equal to the maximum of the repetition rates, if the repetition rates all are an integer power of two. Hence, this may beneficially allow to simplify determining a required number of transmission cycles for which the at least one value has to be determined and/or allowed to reduce the computational requirements, as—in general—the maximum value rises slower (and at least not faster) than the least common multiple.

In some embodiments, the respective repetition rate of the respective repetitive transmissions of each of the plurality of data streams has valid values within a range from 0 to 5000, or a range from 1 to 3000, or a range from 1 to 512. An advantage of one of the valid values being 0 may particularly be, that a data stream having its repetition rate being set to 0 may (temporarily) be excluded from being transmitted. An advantage of one of the valid values being 1 may particularly be, that a data stream having its repetition rate being set to 1 may be configured to be transmitted every transmission cycle. An advantage of the valid values having a fixed upper limit—e.g. 512, 3000 or 5000—may particularly be, that the repetition rates may be represented by a fixed size number representation for integer values, whereby, e.g. implementing the at least one or the numerical optimization for being performed by a node of the telecommunication network—with e.g. limited computing power—may be facilitated.

An advantage of the valid values ranging up to e.g. 512, 3000 or 5000 may particularly be, that this may facilitate selecting appropriate repetition rates and/or that this may provide scalability e.g. for originator nodes, which have to transmit data very often e.g. every or every second network cycle such as an originator node providing control data or sensor data in a closed loop control, and e.g. for originator nodes, which have to transmit data seldomly e.g. every $256^{th}$, $512^{th}$, or $1024^{th}$ network cycle such as an originator node providing relatively (in relation to a time interval of the network cycles) slow changing information such as a (bulk) temperature of a manufacturing apparatus, whereby, e.g. bandwidth of the telecommunication network may be utilized more efficiently.

In some embodiments, the respective repetition rate of the respective repetitive transmissions of each of the plurality of data streams is an integer power of two, wherein an upper limit for valid values is also an integer power of two. In some implementations, the upper limit for valid values is 128, 256, 512 or 1024. This beneficially allows to represent each respective repetition rate by, e.g., an integer data type, hence, simplifying an implementations, and/or by a fixed number of bits, whereby bandwidth of the telecommunication network and/or memory of an apparatus—e.g. a node of the network—performing the method or at least the at least one/the numerical optimization may be utilized more efficiently.

In some embodiments, the respective repetition rate of the respective repetitive transmissions of each of the plurality of data streams is an integer power of two with valid values between and including 1 and 512 (e.g. 1, 2, 4, ..., 256, 512).

In some embodiments, the telecommunication network has a tree-type topology. Furthermore, the respective path is uniquely determined based on a respective originator node and a respective destination node for each of the plurality of data streams.

In some embodiments, the method further comprises receiving at least one configuration signal from at least one originator node, the at least one originator node being adapted to transmit respective repetitive transmissions of at least one of the plurality of data streams, wherein the at least one configuration signal is indicative of at least one of the plurality of data streams, the at least one originator node and at least one destination node, the at least one destination node being adapted to receive respective repetitive transmissions of the at least one of the plurality of data streams.

In some embodiments, the method further comprises establishing topology data indicative of a topology of the telecommunication network.

In some embodiments, in which at least one originator node and at least one destination node are established—e.g. by receiving at least one configuration signal—and in which topology data indicative of a topology of the telecommunication network is established, the method further comprises determining the respective path or a further respective path, from the at least one originator node to the at least one destination node, for the at least one of the plurality of data streams. This may beneficially facilitate using alternate routes—e.g. the further path—in order to mitigate interferences, whereby the respective total traveling time and/or the worst-case arrival time may be (further) reduced.

In some embodiments, the method further comprises receiving at least one configuration signal, e.g. from a node of the telecommunication network, wherein the configuration signal is indicative of the respective paths. This may beneficially allowed to deterministically define the paths.

An advantage of receiving configuration signals—such as the at least one configuration signal being indicative of a respective repetition rate or all repetition rates or such as the at least one configuration signal being indicative of at least one originator node and at least one destination node—may particularly be that the scheduling provided by the method may be dynamically adapted, whereby a flexibility of scheduling may be increased.

In some embodiments, dynamically adapting the scheduling is synergistically combined with providing a warning signal if one or more upper limits are not met. This may beneficially enhance reliability of the scheduling, even when dynamically adapting the scheduling.

In some embodiments, for each of the plurality of data streams, the respective repetitive transmissions are scheduled to start at a transmission cycle of the transmission cycles associated with the respective phase and to be repetitively transmitted with a respective time interval between the starting of adjacent ones of respective repetitive transmissions, wherein the respective time interval is determined by the predetermined length in time of the transmission cycles multiplied by a respective repetition rate of the respective repetitive transmissions. Moreover, the interference between the plurality of data streams further depends the respective repetition rate.

In some embodiments, the method further comprises receiving at least one configuration signal from at least one originator node, the at least one originator node being adapted to transmit respective repetitive transmissions of at least one of the plurality of data streams, wherein the at least one configuration signal is indicative of the respective repetition rate of the respective repetitive transmissions.

In some embodiments, the at least one value indicative of the interference depends on a predetermined number of the transmission cycles.

In some embodiments, the at least one value indicative of the interference depends, for each respective shared transmission link of the plurality of shared transmission links, on a respective interference between two or more repetitive transmissions of the plurality of data streams at the respective shared transmission link.

In some embodiments, the telecommunication network comprises, for each of the plurality of data streams (210), at least one respective path through the telecommunication network, the respective path being used for the respective repetitive transmissions of the respective data stream.

In some embodiments, the method further comprises determining the plurality of shared transmission links based on a comparison between each at least one respective path of each the plurality of data streams, wherein each shared transmission link is part of at least two of the paths.

In some embodiments, the method further comprises determining, for each of the paths and at each of the plurality of shared transmission links, a respective count of repetitive transmissions from one of the paths merging, at the respective shared transmission link, with at least a further one of the paths. Furthermore, in some implementations, the at least one value indicative of the interference depends, for each respective shared transmission link of the plurality of shared transmission links, on the respective counts for the ones of the paths merging at the respective shared transmission link.

In some embodiments, the at least one value indicative of the interference depends, for each respective shared transmission link, on a summation of all respective counts, at the respective shared transmission link, except the respective count having a minimum value of these the respective counts.

In some embodiments, the at least one value indicative of the interference is a maximum value of each of the summations of the respective counts across the plurality of shared transmission links and across a predetermined number of the transmission cycles.

In some embodiments, the method further comprises receiving at least one configuration signal from at least one originator node, the at least one originator node being adapted to transmit respective repetitive transmissions of at least one of the plurality of data streams, wherein the at least one configuration signal is indicative of at least one of the plurality of data streams, the at least one originator node and at least one destination node, the at least one destination node being adapted to receive respective repetitive transmissions of the at least one of the plurality of data streams. Furthermore, the method comprises determining the at least one respective path, from the at least one originator node to the at least one destination node, for the at least one of the plurality of data streams.

In some embodiments, the telecommunication network has a tree-type topology. Moreover, the method further comprises establishing topology data being indicative of the tree-type topology of the telecommunication network, wherein the at least one respective path is determined based on the at least one originator node, the at least one destination node and the topology data.

In some embodiments, the at least one configuration signal is indicative of the at least one respective path through the telecommunication network.

In some embodiments, the method further comprises determining whether the at least one optimization meets one or more upper limits selected from a group comprising: a worst-case interference at any one of the plurality of shared transmission links, and a worst-case total interference. Moreover, the method further comprises selectively establishing, if the at least one optimization fails to meet at least one of the one or more upper limits, topology data being indicative of a topology of the telecommunication network. Moreover, the method further comprises determining a further respective path from the at least one originator node to the at least one destination node based on the topology data. Moreover, the method further comprises determining the respective phase of respective repetitive transmissions for each of the plurality of data streams, based on the at least one optimization and based on a further respective path.

In some embodiments, the at least one optimization is implemented based on a numerical optimization such as the numerical optimization according to the first aspect of the invention. Correspondingly, the numerical optimization may be further implemented according to aspects, (exemplary) embodiments, implementations, advantageous modifications, further modifications and further improvements (also) related to the at least one optimization.

In some embodiments, the at least one respective path is determined based on the at least one originator node, the at least one destination node and the topology data or wherein configuration signal is indicative of the at least one path.

In some embodiments, the at least one optimization has a further objective function comprising a further value indicative of a total interference, wherein the total interference is an aggregation of values indicative of the interference at each one of the plurality of shared transmission links and across a predetermined number of the transmission cycles.

In some embodiments, the network scheduling apparatus comprises or consists of a gateway node. In some embodiments, the network scheduling apparatus comprises or consists of a network controller.

Although the teachings of the present disclosure have been shown and described with respect to certain embodiments, equivalents and modifications will occur to others skilled in the art upon reading and understanding the specification. The scope of the present disclosure includes all such equivalents and modifications.

What is claimed is:

1. A method for scheduling transmissions of a plurality of data streams in a telecommunication network, wherein the transmissions are partitioned into transmission cycles with a predetermined length in time, and wherein respective repetitive transmissions of each of the plurality of data streams are transmitted with a time interval determined by the predetermined length in time of the transmission cycles multiplied by a respective repetition rate of the respective repetitive transmissions, the method comprising:

determining, for each of the plurality of data streams, a respective path through the telecommunication network used for the respective repetitive transmissions of the respective data stream;

determining a plurality of shared transmission links based on a comparison of the paths through the network, wherein each of the shared transmission links is part of at least two of the paths;

based on a numerical optimization, determining a respective phase of the respective repetitive transmissions for each of the plurality of data streams, the numerical optimization having an objective function comprising at least one value indicative of interference between two or more repetitive transmissions of the plurality of data streams; and scheduling the respective repetitive transmissions of each of the plurality of data streams, wherein the respective repetitive transmissions start at a transmission cycle associated with the respective phase;

wherein the at least one value is based on a respective total traveling time of the respective repetitive transmissions of each of the plurality of data streams; and wherein the numerical optimization takes into account one or more upper limits selected from a group consisting of: a worst-case traveling time, a worst-case arrival time, a worst-case delay, and a worst-case aggregate total travelling time.

2. The method of claim 1, wherein the numerical optimization includes using a mixed integer linear program and is performed by a gateway node of the telecommunication network.

3. The method of claim 1, wherein:

for at least one phase, at least one group of respective repetitive transmissions of respective data streams of the plurality of data streams is from at least one originator node;

the at least one originator node is adapted to transmit the repetitive transmissions of the at least one group within transmission cycles associated with the at least one phase according to their respective phases and respective repetition rates, wherein an order of transmission within each of these transmission cycles is determined by a transmission order of the at least one group; and the method further comprises determining, after determining respective phases for each of the plurality of data streams, the transmission order of the at least one group by sorting each repetitive transmissions of the at least one group based on a comparison function taking into account a respective worst-case arrival time of the respective repetitive transmissions.

4. The method of claim 1, further comprising receiving at least one configuration signal indicative of the repetition rates of the repetitive transmissions of the plurality of data streams.

5. The method of claim 1, wherein the objective function of the numerical optimization further comprises an aggregate total travelling time representing an aggregation of each of the values of the total traveling times.

6. The method of claim 1, wherein:

the respective total travelling time depends on one or more transmission delays encountered along the respective path and depends on the interference between the respective repetitive transmissions and other repetitive transmissions of the plurality of data streams;

the worst-case arrival time is determined by the maximum of each of the respective total travelling times including an interference at a respective originator node; and the worst-case delay is determined by the maximum of each of the respective total travelling times excluding an interference at a respective transmission node.

7. The method of claim 1, further comprising selectively providing a warning signal if the numerical optimization fails to meet at least one of the one or more upper limits.

8. The method of claim 1, wherein the numerical optimization comprises determining the at least one value indicative of the interference for a predetermined number of transmission cycles and minimizing an aggregation of the values indicative of the interference across the predetermined number of transmission cycles.

9. The method of claim 8, wherein the respective repetition rate of the respective repetitive transmissions of each of the plurality of data streams is an integer power of two and wherein the predetermined number of transmission cycles is a maximum of the repetition rates.

10. The method of claim 1, wherein:
the telecommunication network has a tree-type topology; and
the respective path is uniquely determined based on a respective originator node and a respective destination node for each of the plurality of data streams.

11. The method of claim 1, further comprising:
receiving at least one configuration signal from at least one originator node adapted to transmit respective repetitive transmissions of at least one of the plurality of data streams;
wherein the at least one configuration signal indicates at least one of the plurality of data streams, the at least one originator node, and at least one destination node adapted to receive respective repetitive transmissions of the at least one of the plurality of data streams;
establishing topology data being indicative of a topology of the telecommunication network; and
determining the respective path or a further respective path, from the at least one originator node to the at least one destination node, for the at least one of the plurality of data streams.

12. The method of claim 1, wherein the telecommunication network comprises a time sensitive network.

13. A gateway node for a telecommunication network, the gateway node comprising: a data processing apparatus programmed to: determine, for each of a plurality of data streams, a respective path through the telecommunication network used for respective repetitive transmissions of the respective data stream; determine a plurality of shared transmission links based on a comparison of the paths through the network, wherein each respective shared transmission link is part of at least two of the paths; based on a numerical optimization, determine a respective phase of the respective repetitive transmissions for each of the plurality of data streams, the numerical optimization having an objective function comprising at least one value indicative of interference between two or more repetitive transmissions of the plurality of data streams; and schedule the respective repetitive transmissions of each of the plurality of data streams, wherein the respective repetitive transmissions start at a transmission cycle associated with the respective phase; wherein the at least one value is based on a respective total traveling time of the respective repetitive transmissions of each of the plurality of data streams; and wherein the numerical optimization takes into account one or more upper limits selected from a group consisting of: a worst-case traveling time, a worst-case arrival time, a worst-case delay, and a worst-case aggregate total traveling time.

14. A method for scheduling transmissions of a plurality of data streams in a telecommunication network, wherein the transmissions are partitioned into transmission cycles with a predetermined length in time, and wherein respective repetitive transmissions of each of the plurality of data streams are transmitted with a time interval determined by the predetermined length in time of the transmission cycles multiplied by a respective repetition rate of the respective repetitive transmissions, the method comprising:
determining, for each of the plurality of data streams, a respective path through the telecommunication network used for the respective repetitive transmissions of the respective data stream;
determining a plurality of shared transmission links based on a comparison of the paths through the network, wherein each of the shared transmission links is part of at least two of the paths;
based on a numerical optimization, determining a respective phase of the respective repetitive transmissions for each of the plurality of data streams, the numerical optimization having an objective function comprising at least one value indicative of interference between two or more repetitive transmissions of the plurality of data streams; and
scheduling the respective repetitive transmissions of each of the plurality of data streams, wherein the respective repetitive transmissions start at a transmission cycle associated with the respective phase;
wherein the numerical optimization comprises determining the at least one value indicative of the interference for a predetermined number of transmission cycles and minimizing an aggregation of the values indicative of the interference across the predetermined number of transmission cycles; and
the respective repetition rate of the respective repetitive transmissions of each of the plurality of data streams is an integer power of two and wherein the predetermined number of transmission cycles is a maximum of the repetition rates.

15. The method of claim 14, wherein the numerical optimization includes using a mixed integer linear program and is performed by a gateway node of the telecommunication network.

16. The method of claim 14, wherein:
for at least one phase, at least one group of respective repetitive transmissions of respective data streams of the plurality of data streams is from at least one originator node;
the at least one originator node is adapted to transmit the repetitive transmissions of the at least one group within transmission cycles associated with the at least one phase according to their respective phases and respective repetition rates, wherein an order of transmission within each of these transmission cycles is determined by a transmission order of the at least one group; and
the method further comprises determining, after determining respective phases for each of the plurality of data streams, the transmission order of the at least one group by sorting each repetitive transmissions of the at least one group based on a comparison function taking into account a respective worst-case arrival time of the respective repetitive transmissions.

17. The method of claim 14, further comprising receiving at least one configuration signal indicative of the repetition rates of the repetitive transmissions of the plurality of data streams.

18. The method of claim 14, wherein the objective function of the numerical optimization further comprises an aggregate total travelling time representing an aggregation of each of the values of the total traveling times.

19. The method of claim 14, wherein:
the respective total travelling time depends on one or more transmission delays encountered along the respective path and depends on the interference between the respective repetitive transmissions and other repetitive transmissions of the plurality of data streams;
the worst-case arrival time is determined by the maximum of each of the respective total travelling times including an interference at a respective originator node; and
the worst-case delay is determined by the maximum of each of the respective total travelling times excluding an interference at a respective transmission node.

20. The method of claim 14, further comprising selectively providing a warning signal if the numerical optimization fails to meet at least one of the one or more upper limits.

21. The method of claim 14, wherein:
the telecommunication network has a tree-type topology; and
the respective path is uniquely determined based on a respective originator node and a respective destination node for each of the plurality of data streams.

22. The method of claim 14, further comprising:
receiving at least one configuration signal from at least one originator node adapted to transmit respective repetitive transmissions of at least one of the plurality of data streams;
wherein the at least one configuration signal indicates at least one of the plurality of data streams, the at least one originator node, and at least one destination node adapted to receive respective repetitive transmissions of the at least one of the plurality of data streams;
establishing topology data being indicative of a topology of the telecommunication network; and
determining the respective path or a further respective path, from the at least one originator node to the at least one destination node, for the at least one of the plurality of data streams.

* * * * *